United States Patent [19]

Kajitani et al.

[11] Patent Number: 5,532,827
[45] Date of Patent: Jul. 2, 1996

[54] APPARATUS FOR REPRODUCING IMAGE DENSITIES USING PIXEL PROCESSING AND METHOD OF USE THEREOF

[75] Inventors: Tetsuji Kajitani; Ariyoshi Hikosaka, both of Osaka; Hideo Azumai, Toyonaka; Satoshi Iwatsubo, Osaka, all of Japan

[73] Assignee: Mita Industrial Co., Ltd., Japan

[21] Appl. No.: 89,332

[22] Filed: Jul. 12, 1993

[30] Foreign Application Priority Data

Jul. 13, 1992 [JP] Japan .................................. 4-209652

[51] Int. Cl.$^6$ ........................... H04N 1/40; G01D 15/14
[52] U.S. Cl. .................... 358/298; 358/456; 358/465; 347/131
[58] Field of Search ..................... 358/298, 406, 358/448, 453, 456–461, 465, 466, 474, 504, 519, 521, 523, 530, 534, 535, 538; 347/131, 183, 184, 188, 254; 382/205, 237–239, 251, 252, 276, 282, 308

[56] References Cited

U.S. PATENT DOCUMENTS 5,086,484  2/1992  Katayama et al. ............... 358/465 X
5,184,213  2/1993  Ishida .............................. 358/298 X
5,245,444  9/1993  Hashimoto ....................... 358/448 X
5,291,309  3/1994  Semasa ............................ 358/456 X
5,321,525  6/1994  Hains ................................... 358/456
5,394,250  2/1995  Shono ............................. 358/534 X Primary Examiner—Peter S. Wong
Assistant Examiner—Eric Frahm
Attorney, Agent, or Firm—Beveridge, DeGrandi, Weilacher & Young

[57] ABSTRACT

Partial images each constituting a predetermined matrix are sequentially taken out, and density data corresponding to pixels constituting the matrix are subjected to correction. The correction of the density data is so made as to respectively add density correcting values predetermined to correspond to pixel positions in the matrix to the density data. Consequently, the density data corresponding to the pixels constituting the matrix are considerably varied. Therefore, in a binary image obtained by subjecting the partial image constituting the matrix to halftone processing, the density of a document image is sufficiently reproduced.

3 Claims, 36 Drawing Sheets

Fig. 6

| ADDRESS | CONTENTS |
|---|---|
| 0000 | SHADING CORRECTION DATA OF 1ST PIXEL |
| 0001 | |
| 0002 | BST1 |
| 0003 | WST1 |
| 0004 | SHADING CORRECTION DATA OF 2ND PIXEL |
| 0005 | |
| 0006 | BST2 |
| 0007 | WST2 |
| 0008 ⋮ | ⋮ |
| 1AFC | SHADING CORRECTION DATA OF 1278TH PIXEL |
| 1AFD | |
| 1AFE | BST1728 |
| 1AFF | WST1728 |
| 1B00 ∫ 1FFF | WORK AREA |
| 2000 ∫ 26BF | ACCUMULATED ERROR : AT ERROR DIFFUSION MODE BINARY CODE DATA : AT SIMPLE BINARY-CODING MODE |
| 26C0 ∫ 26FF | $\gamma$ CORRECTION TABLE |
| 2700 ∫ 7FFF | CPU WORK AREA |

| | W0 | W1 | |
|---|---|---|---|
| | W2 | W3 | |
| W4 | | | W5 |
| W6 | | | W7 |

| 0001 | 1000 | 1001 | 0000 |
|------|------|------|------|
| 0011 | 1010 | 1011 | 0010 |
| 1100 | 0101 | 0100 | 1101 |
| 1110 | 0111 | 0110 | 1111 |

PRIOR ART

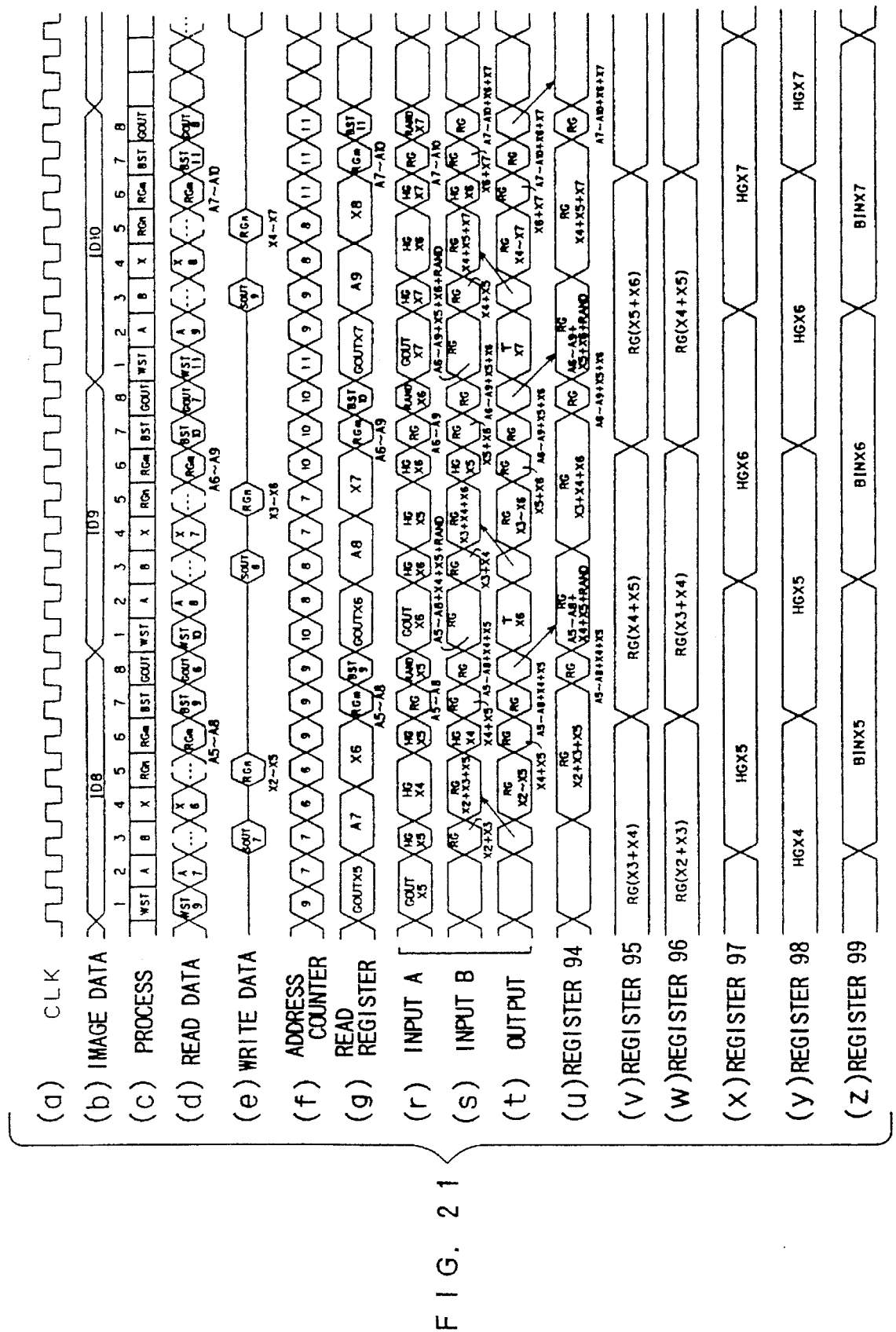

FIG. 22

| CYCLE NUMBER | BIT CALCULATION EXPRESSION |
|---|---|
| 3 | $\begin{array}{r} \phantom{+}\;A(6)\;A(5)\;A(4)\;A(3)\;A(2)\;A(1)\;A(0) \\ +\;B(6)\;B(5)\;B(4)\;B(3)\;B(2)\;B(1)\;B(0) \\ \hline A+B(7)\;A+B(6)\;A+B(5)\;A+B(4)\;A+B(3)\;A+B(2)\;A+B(1)\;A+B(0) \end{array}$ |
| 4 | $\begin{array}{r} \phantom{+}\;A+B(7)\;A+B(6)\;A+B(5)\;A+B(4)\;A+B(3)\;A+B(2)\;A+B(1)\;A+B(0) \\ +\;(A+B)'(7)\;(A+B)'(6)\;(A+B)'(5)\;(A+B)'(4)\;(A+B)'(3)\;(A+B)'(2)\;(A+B)'(1)\;(A+B)'(0) \\ \hline AV(8)\;AV(7)\;AV(6)\;AV(5)\;AV(4)\;AV(3)\;AV(2)\;AV(1)\;AV(0) \end{array} = 4AV$ |
| 5 | $\begin{array}{r} \phantom{+}\;X(6)\;X(5)\;X(4)\;X(3)\;X(2)\;X(1)\;X(0)\;\overline{AV}(0)\;\;=2X \\ +\;\overline{AV}(8)\;\overline{AV}(7)\;\overline{AV}(6)\;\overline{AV}(5)\;\overline{AV}(4)\;\overline{AV}(3)\;\overline{AV}(2)\;\overline{AV}(1)\;=-2AV \\ \hline S(8)\;S(7)\;S(6)\;S(5)\;S(4)\;S(3)\;S(2)\;S(1)\;S(0) \end{array}$ |
| 6 | $\begin{array}{r} \phantom{+}\;Xn{-}1(6)\;Xn{-}1(5)\;Xn{-}1(4)\;Xn{-}1(3)\;Xn{-}1(2)\;Xn{-}1(1)\;Xn{-}1(0) \\ +\;S(6)\;S(5)\;S(4)\;S(3)\;S(2)\;S(1)\;S(0) \\ \hline XS(7)\;XS(6)\;XS(5)\;XS(4)\;XS(3)\;XS(2)\;XS(1)\;XS(0) \end{array}$ |
| 5 & 6 | S, XS, SLEVB, SLEVW → DECISION OF METHOD FOR PROCESSING DATA OF PIXEL → FOUT(6) FOUT(5) FOUT(4) FOUT(3) FOUT(2) FOUT(1) FOUT(0) |

F I G. 2 3
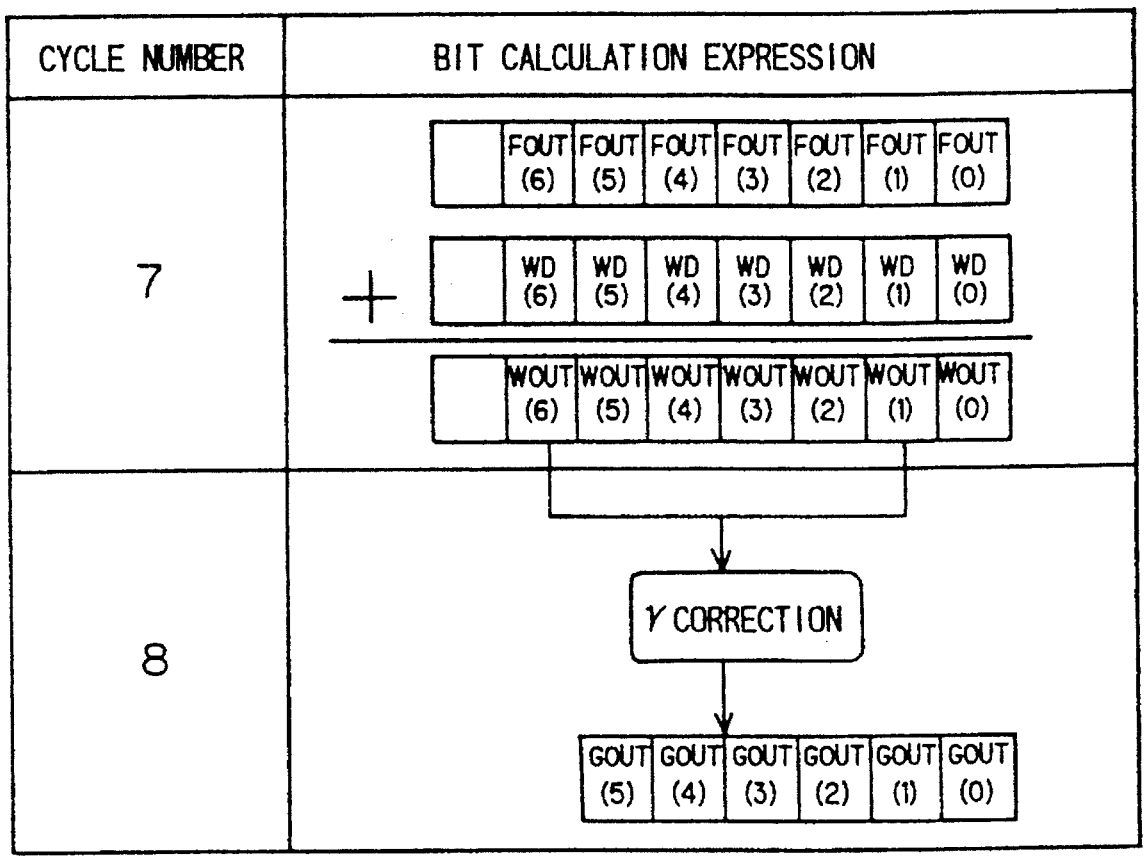

FIG. 24

| CYCLE NUMBER | BIT CALCULATION EXPRESSION |
|---|---|
| 8 |        BST(6) BST(5) BST(4) BST(3) BST(2) BST(1) BST(0)<br>− OFFS(6) OFFS(5) OFFS(4) OFFS(3) OFFS(2) OFFS(1) OFFS(0)<br>───────────────────────────────────<br>BST'(7) BST'(6) BST'(5) BST'(4) BST'(3) BST'(2) BST'(1) BST'(0) |
| 1 |        WST(6) WST(5) WST(4) WST(3) WST(2) WST(1) WST(0)<br>−    BST'(6) BST'(5) BST'(4) BST'(3) BST'(2) BST'(1) BST'(0)<br>───────────────────────────────────<br>W−B'(7) W−B'(6) W−B'(5) W−B'(4) W−B'(3) W−B'(2) W−B'(1) W−B'(0) |
| 2 |        ID(6) ID(5) ID(4) ID(3) ID(2) ID(1) ID(0)<br>−    BST'(6) BST'(5) BST'(4) BST'(3) BST'(2) BST'(1) BST'(0)<br>───────────────────────────────────<br>I−B'(7) I−B'(6) I−B'(5) I−B'(4) I−B'(3) I−B'(2) I−B'(1) I−B'(0) |
| 3∼1 | I−B'(6) I−B'(5) I−B'(4) I−B'(3) I−B'(2) I−B'(1) I−B'(0) 0<br>−    W−B'(6) W−B'(5) W−B'(4) W−B'(3) W−B'(2) W−B'(1) W−B'(0)<br>───────────────────────────────────<br>SOUT(k) DIV(7) DIV(6) DIV(5) DIV(4) DIV(3) DIV(2) DIV(1) DIV(0)<br>↓<br>SOUT(6) SOUT(5) SOUT(4) SOUT(3) SOUT(2) SOUT(1) SOUT(0) |

FIG. 25

| CYCLE NUMBER | BIT CALCULATION EXPRESSION |
|---|---|
| 6 |        HG(B7) HG(B6) HG(B5) HG(B4) HG(B3) 0<br>+      HG(C7) HG(C6) HG(C5) HG(C4) HG(C3)<br>―――――――――――――――――――<br>RG(a7) RG(a6) RG(a5) RG(a4) RG(a3) RG(a2) RG(a1) RG(a0) |
| 7 |   RG(m6) RG(m5) RG(m4) RG(m3) RG(m2) RG(m1) RG(m0)<br>+ RG(a7) RG(a6) RG(a5) RG(a4) RG(a3) RG(a2) RG(a1) RG(a0)<br>―――――――――――――――――――<br>RG(b7) RG(b6) RG(b5) RG(b4) RG(b3) RG(b2) RG(b1) RG(b0) |
| 8 |                  HG(B2) HG(B1) HG(B0)<br>+ RG(b7) RG(b6) RG(b5) RG(b4) RG(b3) RG(b2) RG(b1) RG(b0)<br>―――――――――――――――――――<br>RG(c7) RG(c6) RG(c5) RG(c4) RG(c3) RG(c2) RG(c1) RG(c0) |
| 1 & 2 |   GOUT(5) GOUT(4) GOUT(3) GOUT(2) GOUT(1) GOUT(0)<br>+ RG(c7) RG(c6) RG(c5) RG(c4) RG(c3) RG(c2) RG(c1) RG(c0)<br>―――――――――――――――――――<br>T(7) T(6) T(5) T(4) T(3) T(2) T(1) T(0) |
| 2 | BINARY-CODING JUDGMENT, ERROR CALCULATION → BINARY-CODING OUTPUT<br>↓ ERROR<br>HG(A7) HG(A6) HG(A5) HG(A4) HG(A3) HG(A2) HG(A1) HG(A0) |

F I G. 2 6

| CYCLE NUMBER | BIT CALCULATION EXPRESSION |
|---|---|
| 3 | HG(A7) HG(A6) HG(A5) HG(A4) HG(A3)<br>+ RG'(a7) RG'(a6) RG'(a5) RG'(a4) RG'(a3) RG'(a2) RG'(a1) RG'(a0)<br>─────────<br>RG(d7) RG(d6) RG(d5) RG(d4) RG(d3) RG(d2) RG(d1) RG(d0) |
| 4 & 5 | HG(A7) HG(A6) HG(A5) HG(A4) HG(A3)<br>+ RG(d7) RG(d6) RG(d5) RG(d4) RG(d3) RG(d2) RG(d1) RG(d0)<br>─────────<br>RG(n7) RG(n6) RG(n5) RG(n4) RG(n3) RG(n2) RG(n1) RG(n0) |

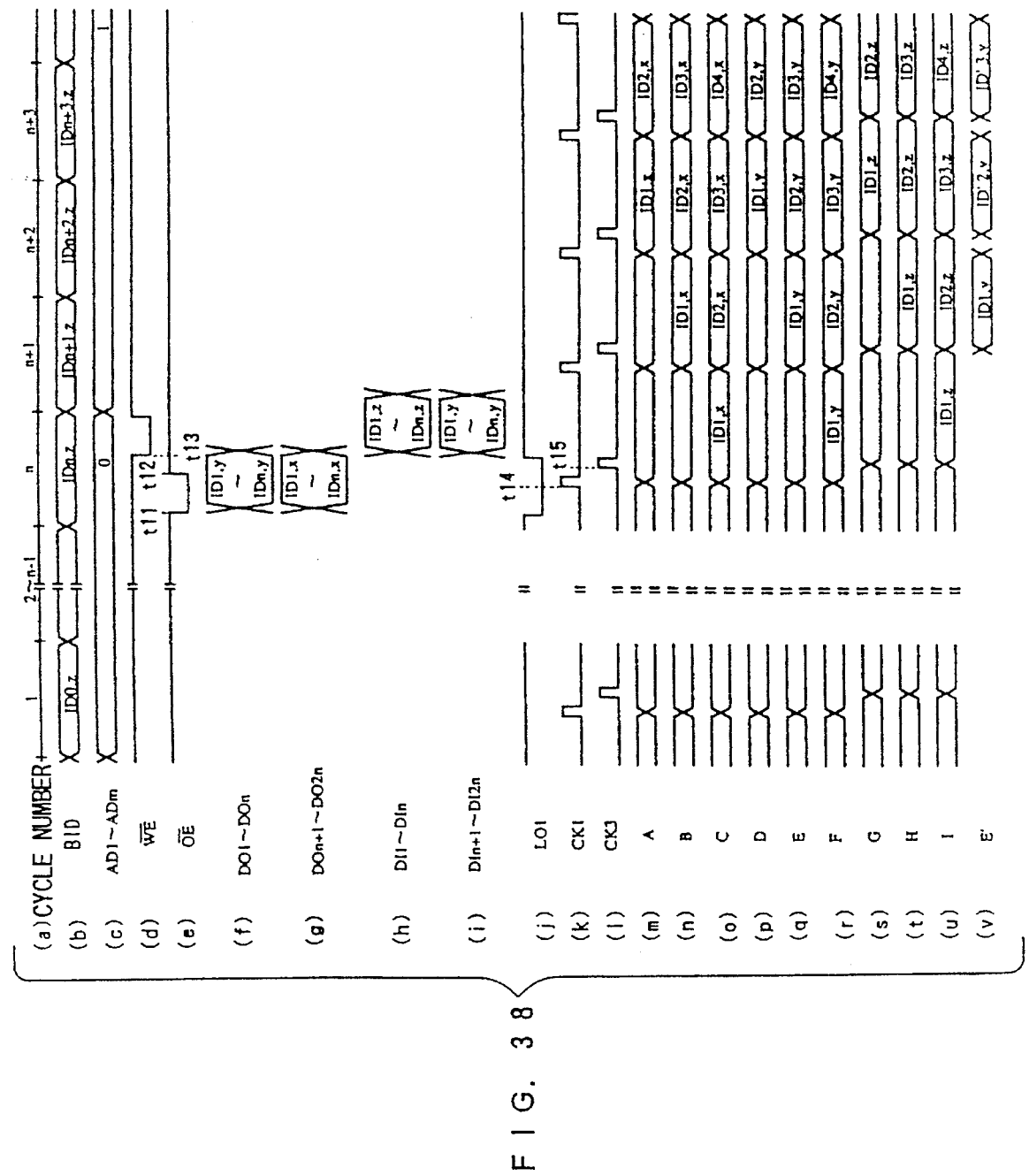
F I G. 38

FIG. 39

(a) FOUT: 4×4 matrix of 6s (b) GOUT: 4×4 matrix of 5s (c) DITHER MATRIX:
| 0 | 8 | 2 | 10 |
|---|---|---|---|
| 12 | 4 | 14 | 6 |
| 3 | 11 | 1 | 9 |
| 15 | 7 | 13 | 5 |

(d) PRINTER OUTPUT — 161, 162

PRIOR ART ns 5,532,827

APPARATUS FOR REPRODUCING IMAGE DENSITIES USING PIXEL PROCESSING AND METHOD OF USE THEREOF

CROSS REFERENCE TO RELATED APPLICATIONS

This application claims priority benefits under 35 USC §119 of Japanese Patent Application Serial No. 209652/1992, filed on Jul. 13, 1992, the disclosure of which is incorporated herein by reference.

BACKGROUND OF THE INVENTION

1. Field of the Invention

The present invention relates to an image density reproducing method and an image density reproducing apparatus used in a facsimile, an image scanner for processing density data of an image of a document optically read to reproduce the density of the document.

2. Description of the Related Art

In, for example, a facsimile or an image scanner, a document is optically read by a CCD (Charge Coupled Device) image sensor or the like, and an image of the document is stored as digital data. The document image is, for example, printed to be reproduced on the basis of the data. An electrophotographic technique for scanning a photoreceptor by a laser beam to form an electrostatic latent image and developing the electrostatic latent image into a toner image, for example, is applied when printing the image.

If digital data obtained by converting an output of the image sensor is directly binary-coded to form an image, it is impossible to accurately reproduce the density of a halftone document image due to reading characteristics of the image sensor and development characteristics to a toner image.

In order to faithfully reproduce the density of a halftone document image, therefore, data from the image sensor has been conventionally subjected to a variety of processing. Examples of such processing include filtering processing using a so-called Laplacian filter similar filter for compensating for the resolution of an image, gamma correction processing for correcting gamma characteristics of the image sensor, and halftone processing such as a dither method and error diffusion processing.

The gamma correction processing is achieved by preparing a table in which a one-to-one correspondence between input data and gamma correction data is previously established and reading out the gamma correction data corresponding to the input data from this table. Specifically, as shown in, for example, FIG. 15, gamma correction data GOUT are predetermined relative to input data WOUT. A white portion and a black portion of an image are emphasized by this correction. In FIG. 15, the whiter the image is, the larger the value of the data.

Before, for example, the gamma correction processing, when data FOUT corresponding to 16 pixels constituting a matrix with 4×4 pixels have values as shown in FIG. 39(a), data GOUT which are subjected to gamma correction shown in FIG. 15 becomes data as shown in FIG. 39(b). In this case, the values of the data FOUT corresponding to the pixels constituting the matrix with 4×4 pixels are all "6", and an image area in the matrix with 4×4 pixels is an area having a so-called intermediate density.

If an image is binary-coded by performing halftone processing using a dither matrix shown in FIG. 39(c), a binary image printed and outputted becomes an image shown in FIG. 39(d). In FIG. 39(d), a black pixel is indicated by oblique hatching.

As apparent from the comparison between FIG. 39(a) and 39(b), the data corresponding to the 16 pixels are similarly subjected to Gamma correction. Accordingly, in both cases, that is, a case where the data FOUT are directly binary-coded using the dither matrix and a case where the data GOUT are binary-coded using the dither matrix, the image shown in FIG. 39(d) is obtained. Consequently, the same results as those in a case where gamma correction is not made are obtained, so that the density is not sufficiently reproduced.

Specifically, white pixels 161 and 162, for example, surrounded by black pixels are defaced due to the spread of toner particles forming the black pixels, so that the density may be insufficiently reproduced. Consequently, an image portion corresponding to the 4×4 pixels may be deep black, thereby making it impossible to reproduce an intermediate density.

SUMMARY OF THE INVENTION

An object of the present invention is to solve problems with the above described technical subject and to provide an image density reproducing method making it possible to sufficiently reproduce the density of an image by effectively performing processing with respect to image data.

Furthermore, another object of the present invention is to provide an image density reproducing apparatus making it possible to sufficiently reproduce the density of an image by effectively performing processing with respect to image data.

In the present invention, image portions each constituting a predetermined matrix are sequentially taken out from an image read in units of pixels by optical image reading means. Density correcting values predetermined to correspond to pixel positions in the matrix are respectively added to density data corresponding to pixels in the previously taken out image portion.

Consequently, the density is adjusted in units of partial images each constituting a predetermined matrix. Therefore, even when all pixels in the partial image have an intermediate density data, for example, the density data corresponding to the pixels in this partial image can be considerably varied.

Therefore, correction for representing an intermediate density in units of partial images is made. Consequently, the density of the above described partial image represented by binary data obtained through halftone processing apparently becomes a density close to the intermediate density of a document image.

Meanwhile, conditions may be established when the density is corrected. Specifically, a density correcting value is added only to, for example, density data corresponding to a pixel having a value exceeding a predetermined value. Consequently, pixel having density data corresponding apparently to a a black pixel is not apparently subjected to density adjustment processing, for example, so that the density of such a pixel is not corrected to an intermediate value. Therefore, it is possible to improve the reproducibility of the density by establishing suitable conditions.

Furthermore, when conditions are established, a condition corresponding to a pixel position in a predetermined matrix which is a unit of density adjustment may be established. Specifically, a different condition is established for each pixel position. When the condition is satisfied in each pixel position, a density correcting value corresponding to the pixel position is added to density data corresponding to the pixel in the pixel position, thereby achieving the density adjustment. Consequently, it is possible to further improve the reproducibility of the density.

Additionally, gamma correction may be made for each pixel position in the above described predetermined matrix. Specifically, the correlation between data before and after the gamma correction is set for each pixel position in the matrix. In this case, even when all pixels in the partial image constituting the matrix have an intermediate density data, for example, the density data of each of the pixels can be varied after the gamma correction. Therefore, in a binary image obtained by subjecting the data after the gamma correction to halftone processing, an intermediate density can be sufficiently reproduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a bock diagram showing a state where storage areas are assigned in a memory;

FIG. 7 is a diagram for explaining density adjustment processing;

FIG. 8 are diagrams for explaining density adjustment processing, gamma correction processing and the like;

FIG. 9 are diagrams for explaining density adjustment processing, gamma correction processing and the like;

FIG. 10 is a diagram for explaining density adjustment processing;

FIG. 11 are diagrams for explaining density adjustment processing, gamma correction processing and the like;

FIG. 14 is a diagram showing addresses assigned to pixel positions in a matrix which is to be subjected to density adjustment processing;

FIG. 21 is a timing chart for explaining an operation related to gamma correction processing and error diffusion processing;

FIG. 22 is a diagram for explaining a bit calculation related to filtering processing;

FIG. 23 is a diagram for explaining a bit calculation related to density adjustment processing and gamma correction processing;

FIG. 24 is a diagram for explaining a bit calculation related to shading correction processing;

FIG. 25 is a diagram for explaining a bit calculation related to error diffusion processing;

FIG. 26 is a diagram for explaining a bit calculation related to error diffusion processing;

FIG. 38 is a timing chart for explaining an operation;

FIG. 39 are diagrams for explaining the problem in the prior art.

DESCRIPTION OF THE PREFERRED EMBODIMENT

One embodiment of the present invention will be described in detail by taking a facsimile as an example.

Figure 1:
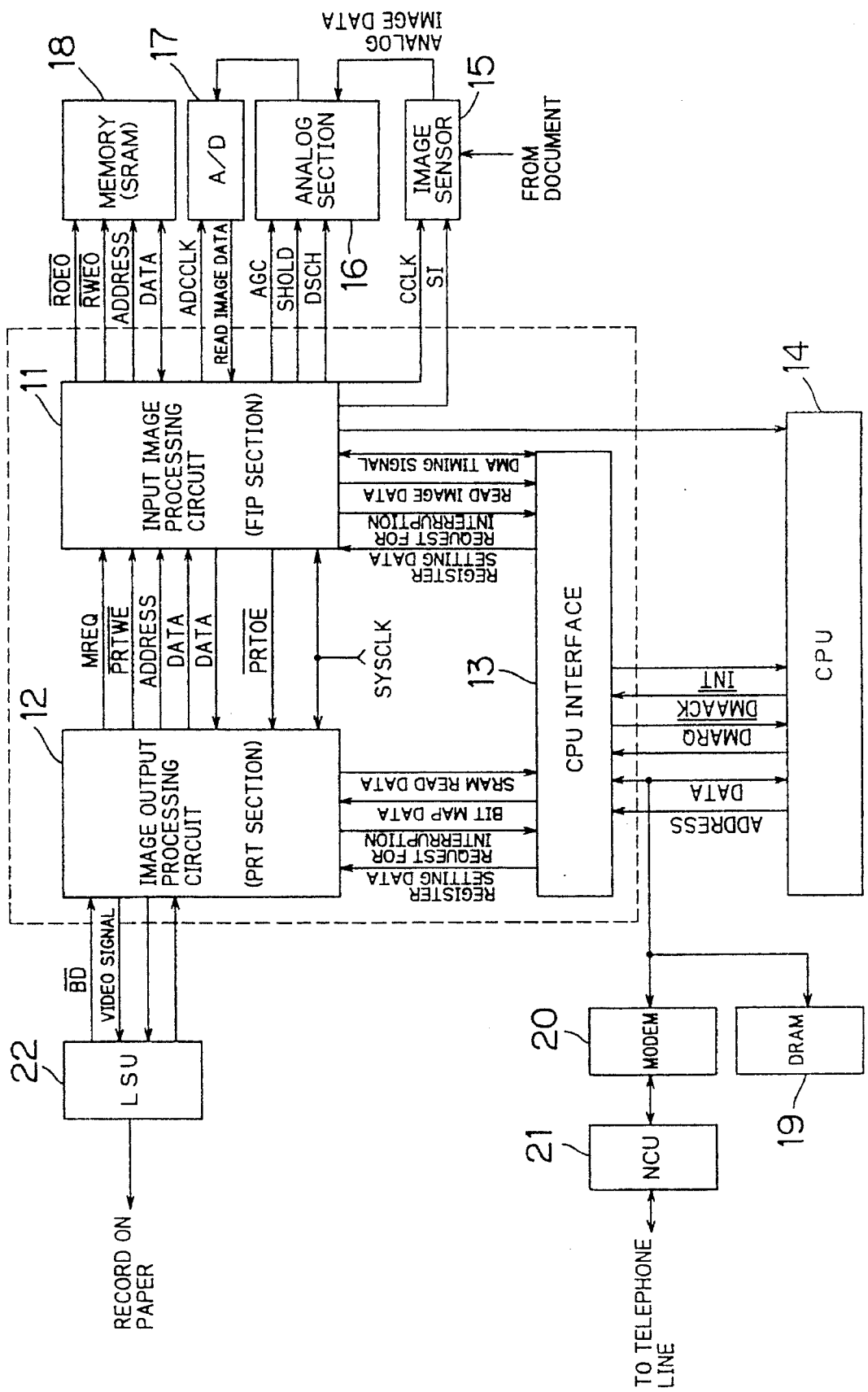
FIG. 1 is a block diagram showing the entire construction of a facsimile to which one embodiment of the present invention is applied.

FIG. 1 is a block diagram showing the electrical construction of a facsimile in which one embodiment of the present invention is incorporated.

The facsimile comprises an input image processing circuit (a FIP (Fax Image Sensor Processor) section) 11, an image output processing circuit (a PRT section) 12, a CPU 14 for carrying out supervisory control of the entire facsimile, and a CPU interface 13 required to connect the input image processing circuit 11 and the image output processing circuit 12 to the CPU 14. The input image processing circuit 11 and the image output processing circuit 12 are asynchronously operated. In addition, the CPU interface 13 contains a DMA (Direct Memory Access) function in the present embodiment.

When a document is set in the facsimile and is read, a driving clock CCLK and a horizontal synchronizing signal SI are applied to an image sensor 15 from the input image processing circuit 11. The image sensor 15 optically reads a document image on the basis of the applied driving clock CCLK and the applied horizontal synchronizing signal SI, to apply read analog image data to an analog section 16.

An automatic gain control signal AGC, a sample-and-hold signal SHOLD and a gain setting signal DSCH are applied from the input image processing circuit 11 to the analog section 16. The analog image data applied from the image sensor 15 is changed into a sample-and-hold signal by predetermined amplification processing, to be applied to an analog-to-digital converter 17.

The analog-to-digital converter 17 is operated by a conversion clock ADCCLK applied from the input image processing circuit 11, and converts the applied sample-and-hold signal into digital image data and applies the digital image data to the input image processing circuit 11.

In the input image processing circuit 11, a variety of input image processing is performed with respect to the digital image data (read image data) applied from the analog-to-digital converter 17. Input image processing includes shading correction processing, binary-coded correction processing, and an error diffusion processing required when a halftone is represented, with respect to the read image data.

In the input image processing, two-dimensional image processing must be performed on the basis of data corresponding to a plurality of lines. Accordingly, a memory for storing image data corresponding to at least two lines and a variety of parameters required for the image processing is required. Therefore, a memory 18 serving as storing means which is constituted, for example, by an SRAM (a static random access memory) of 32 kilo bytes is connected to the input image processing circuit 11. A given area in the memory 18 is utilized as a line memory, and predetermined data for shading correction operating and error diffusion processing are stored in the given area in the memory 18.

The input image processing circuit 11 applies to the memory 18 a read strobe signal/ROE0 or a write strobe signal/RWE0 and designates an address to write or read out data corresponding to a line to or from an area where the address is designated. In addition, the input image processing circuit 11 performs the input image processing with respect to the read image data using the data corresponding to a line read out from the memory 18.

Access, that is, writing or reading of data to or from the memory 18, by the input image processing circuit 11 is made in synchronization with a memory access synchronous clock SYSCLK having a frequency of, for example, 20 MHz. Data of one pixel is processed utilizing as one cycle 16 memory access synchronous clocks SYSCLK.

The driving clock CCLK applied to the image sensor 15 has a frequency of, for example, approximately 400 KHz (the reason why such a frequency is applied is that the operation speed of the image sensor 15 is limited). The speed of the memory access synchronous clock SYSCLK is made sufficiently higher than the speed of the image sensor 15, that is, the speed of the driving clock CCLK.

The read image data after being subjected to the input image processing is directly stored once in a DRAM (a dynamic random access memory) 19. The data is transferred from the input image processing circuit 11 to the DRAM 19 by DMA transfer because a DMA function is contained in the CPU interface 13. The DMA transfer is performed when the read image data is applied from the input image processing circuit 11 to the CPU interface 13 and an amount of the data reaches a predetermined amount. Specifically, when the amount of the data reaches a predetermined amount, the CPU interface 13 issues a DMA request to the CPU 14, and transfers the read image data to the DRAM 19 after it receives DMA acknowledgment from the CPU 14.

The read image data stored once in the DRAM 19 is read out and subjected to compression processing by the CPU 14, to be stored in the DRAM 19 again. There are various systems well known in the art of facsimiles as being standard for compression precessing, such as MMR, MR, and MH.

The read image data compressed and stored in the DRAM 19 is read out and applied to a modem 20 by the CPU 14. The read image data (digital data) is converted into analog data in the modem 20, and the analog data is outputted to a telephone line through an NCU (Network Control Unit) 21 and is transmitted to a facsimile on the other side of the communication.

On the other hand, when data is transmitted through the telephone line, the data is received by the NCU 21. The received data (analog data) is converted into digital data in the modem 20 and is stored in the DRAM 19. This data is compressed data.

The compressed data stored in the DRAM 19 is read out and subjected to expansion processing by the CPU 14, to be stored in the DRAM 19 again.

Thereafter, the CPU 14 applies the image data stored in the DRAM 19 again to the image output processing circuit 12.

When the image data is applied from the CPU 14 through the CPU interface 13 to the image output processing circuit 12, the image output processing circuit 12 subjects the image data to output processing, and drives an LSU (a laser scanning unit) 22 to record the image data after the output processing.

The output processing performed by the image output processing circuit 12 includes, for example, smoothing processing for smoothing the irregularity of the contour of image, conversion processing of the pixel or line density in a case where an image is enlarged or reduced, and conversion processing of the pixel density due to the difference between the density of the image data applied and the resolution of the LSU 22. In the output processing, a smoothing pattern corresponding to a pixel to be processed (which is called "target pixel" hereinafter) in the image data is varied depending on the state of pixels around the target pixel, and the logical OR of data on a plurality of lines is carried out to convert the pixel density, so that a memory for holding the image data is required. In addition, when a video signal corresponding to the image data is outputted to the LSU 22 from the image output processing circuit 12, it is necessary to store the video signal once in the line memory serving as a buffer, read out the video signal from the line memory serving as a buffer and output the video signal to the LSU 22 because there is a difference between the speed for output processing and the processing speed of the LSU 22. Consequently, the line memory is required. Also in the output processing, therefore, the memory 18 is used.

Access to the memory 18 by the image output processing circuit 12 is made in synchronization with the memory access synchronous clock SYSCLK, similarly to the access to the memory 18 by the input image processing circuit 11 and is made through the input image processing circuit 11. Therefore, the image output processing circuit 12 applies a memory access request signal MREQ and a write strobe signal/PRTWE or a read strobe signal/PRTOE to the input image processing circuit 11, and designates an address to write or read out data to or from an area where the address is designated.

Although the input image processing circuit 11 and the image output processing circuit 12 are asynchronously operated as described above, a common memory access synchronous clock SYSCLK is applied to both the circuits. Therefore, the input image processing circuit 11 and the image output processing circuit 12 access the memory 18 in synchronization with the memory access synchronous clock SYSCLK while being asynchronously operated.

When the memory access request signal MREQ is not outputted from the image output processing circuit 12, the input image processing circuit 11 has the right of access to the memory 18.

Furthermore, one cycle of the operation of the input image processing circuit 11 is set to 16 memory access synchronous clocks SYSCLK. Moreover, access to the memory 18 within one cycle is completed by eight clocks out of 16 memory access synchronous clocks. Consequently, the input image processing circuit 11 is so adapted for each cycle as to perform a memory access operation on the basis of eight clocks out of 16 memory access synchronous clocks SYSCLK and enter the stopped state (the wait state) during a period of the remaining eight clocks.

The reason why one cycle of the operation of the input image processing circuit 11 is thus constructed utilizing as a unit 16 memory access synchronous clocks SYSCLK, is that the read image data applied from the image sensor 15 to the input image processing circuit 11 is inputted for each pixel in synchronization with the driving clock CCLK having a relatively low frequency, for example, approximately 400 KHz, while the memory access synchronous clock SYSCLK is a clock having a relatively high frequency, for example, 20 MHz. Specifically, if one cycle of the operation of the input image processing circuit 11 is determined utilizing as a unit of time, a period during which read image data corresponding to one pixel is applied to the input image processing circuit 11, the cycle is constituted by 16 memory access synchronous clocks SYSCLK.

As a result of the foregoing, even when the input image processing circuit 11 has the right of access to the memory 18, it is in the stopped state in a period of eight memory access synchronous clocks SYSCLK for each cycle.

On the other hand, the memory access request signal MREQ is applied to the input image processing circuit 11 at arbitrary timing from the image output processing circuit 12 which is operated asynchronously with the input image processing circuit 11. If this request signal MREQ is applied, the right of access to the memory 18 is transferred to the image output processing circuit 12 as described above.

Furthermore, the input image processing circuit 11 stops operating in response to the memory access request signal MREQ and transfers the right of access to the memory 18 to the image output processing circuit 12. Therefore, the image output processing circuit 12 can access the memory 18. A time period during which the memory 18 is accessed once by the image output processing circuit 12 is predetermined, for example, a period of eight memory access synchronous clocks SYSCLK.

When the memory 18 has been accessed once by the image output processing circuit 12, the memory access request signal MREQ from the image output processing circuit 12 is not outputted. Therefore, the memory access signal switching circuit is switched to the input image processing circuit 11, so that the input image processing circuit 11 acquires the right of access to the memory 18 again.

In this case, a time period during which the memory 18 is accessed by the input image processing circuit 11 may be a period of eight memory access synchronous clocks SYSCLK for each cycle. If the period of eight memory access synchronous clocks SYSCLK is ensured for as the time period during which the memory 18 is accessed for each cycle, the access to the memory 18 by the input image processing circuit 11 can be made without being interfered with.

Specifically, even if the memory access request signal MREQ from the image output processing circuit 12 is interrupted at arbitrary timing, the operation of the input image processing circuit 11 may be stopped in a time period during which the request signal MREQ is being interrupted. Moreover, even if this request signal MREQ is not interrupted, a time period during which the operation is stopped inevitably exists in each cycle. The time period during which the operation is stopped exists at arbitrary timing in one cycle. Accordingly, the access to the memory 18 by the input image processing circuit 11 can be also made without being interfered with.

Furthermore, the access to the memory 18 by the image output processing circuit 12 can be made at arbitrary timing for each cycle.

Figure 2:
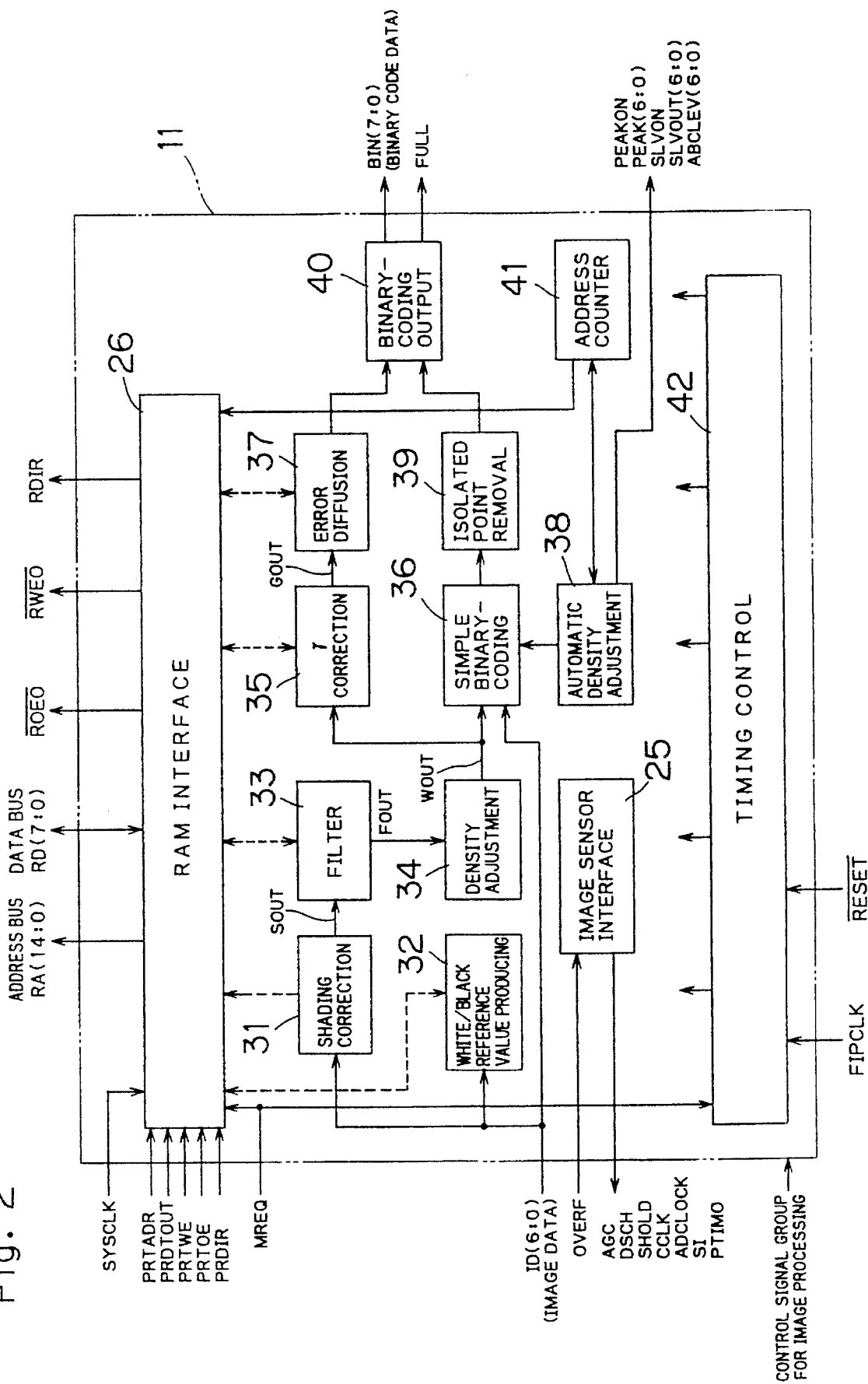
FIG. 2 is a block diagram showing the internal construction of an input image processing circuit in the facsimile shown in FIG. 1.

FIG. 2 is a block diagram showing the internal construction of the input image processing circuit 11. The input image processing circuit 11 comprises an image sensor interface 25 for outputting signals for driving the image sensor 15, the analog section 16, and the analog-to-digital converter 17. In addition, there is provided a RAM interface 26 for sending or receiving data to or from the memory 18. A 15-bit address bus RA, and a 8-bit data bus RD are connected to the RAM interface 26. A read strobe signal/ROE0, a write strobe signal/RWE0 and the like are applied to the memory 18 from the RAM interface 26. On the other hand, an address signal PRTADR, data PRDTOUT, a write strobe signal PRTWE, and a read strobe signal PRTOE are applied from the image output processing circuit 12 to the RAM interface 26, and a memory access request signal MREQ is further inputted thereto. In addition, the above described memory access synchronous clock signal SYSCLK is applied to the RAM interface 26.

7-bit image data ID from the analog-to-digital converter 17 is applied to a shading correcting section 31, so that the variation in density between pixels due to the variation in luminance of a light source for reading is corrected.

Shading correction is made on the basis of black reference data BST corresponding to a deep black image and white reference data WST corresponding to a pure white image. The black reference data BST and the white reference data WST are produced by a white/black reference value producing section 32, and are written to the memory 18 through the RAM interface 26. The black reference data BST is generated by acquiring an output of the image sensor 15 in a state where a lamp for document illumination goes out. In addition, the white reference data WST is generated by lighting the lamp for document illumination to cause the image sensor 15 to read a white reference plate on which a white reference image is formed.

The white/black reference value producing section 32 calculates the difference between the maximum output data of the analog-to-digital converter 17 and the white reference data WST as an offset OFFSET when the white reference data WST is generated. This offset OFFSET is written to the memory 18, to be used for the shading correction (whose details will be described later). Specifically, the white/black reference value producing section 32 functions as offset operating means, to automatically generate an offset OFFSET at the same time that the white reference data WST is generated. The offset OFFSET need not be always automatically generated. Alternatively, the offset OFFSET may be operated on the basis of the white reference data WST and the maximum output data of the analog-to-digital converter 17 in response to a predetermined operation from an operating section of the facsimile.

Data SOUT, after the shading correction, is inputted to a filtering processing section 33. In the filtering processing section 33, image areas, that is, a halftone image area and a binary image area, are detected in a separate manner, and an image in the binary image area is subjected to processing for emphasizing an edge portion of the image.

Data FOUT after filtering processing is applied to a density adjustment processing section 34. The density adjustment processing section 34 performs processing for enhancing the reproducibility of the density, particularly the density of a halftone image. Specifically, image portions each including 16 pixels constituting a matrix with 4×4 pixels are sequentially taken out, and a density correcting value predetermined to correspond to each of pixel positions in the matrix is added to data corresponding to a pixel in each pixel position.

An output signal WOUT of the density adjustment processing section 34 is applied to a gamma correcting section 35 and a simple binary-coding processing section 36. Specifically, data representing a halftone image is applied to the gamma correcting section 35, and data representing a binary image is applied to the simple binary-coding processing section 36.

In the gamma correcting section 35, the image data is subjected to correction for correcting gamma characteristics of the image sensor 15 and development characteristics in a case where an electrostatic latent image formed on a photoreceptor by scanning of a laser beam is developed into a toner image in order to accurately reproduce the density of a document image.

Data GOUT after the gamma correction is applied to an error diffusion processing section 37. Error diffusion processing is a pseudo halftone processing method and a technique for weighting a binary-coded error between the read density and the binary-coded density of each reference pixels in the vicinity of a target pixel in accordance with the positional relationship with the target pixel and distributing the error to the target pixel, and performing binary-coding processing with respect to the target pixel on the basis of the result of addition of the density of the target pixel and the binary-coded errors distributed from the reference pixels in the vicinity of the target pixel. The binary-coding processing is performed on the basis of a predetermined threshold value.

The data WOUT applied to the simple binary-coding processing section 36 from the density adjustment processing section 34 is binary-coded as "0" or "1" by a predetermined threshold value. A threshold value for binary-coding is inputted to the simple binary-coding processing section 36 from an automatic density adjustment processing section 38. The automatic density adjustment processing section 38 finds the average value of the peak densities on a plurality of lines and changes the threshold value for binary-coding on the basis of the average value. Therefore, different threshold values are set for respective portions of, for example, one document.

Binary data from the simple binary-coding processing section 36 is inputted to an isolated point removal processing section 39. Isolated point removal processing is, for example, processing for preventing the image quality from being lowered due to the nonuniformity in the rotation of a motor for conveying a document and removing, when a white pixel or a black pixel, for example, alone exists due to noise such as dirt on the surface of the document, a so-called isolated pixel. The isolated point removal processing can be performed by forcing, when all pixels in predetermined positions around a given target pixel have binary data corresponding to one of the white pixel and the black pixel, binary data corresponding to the target pixel to be converted into the binary data.

The isolated black pixel or the white pixel can be prevented from further processing, thereby making it possible to improve the image quality. Moreover, compression efficiency in compression coding of the binary data for facsimile transmission is increased, thereby decreasing the amounts of transmission codes. Therefore, it is possible to establish high speed communication.

The binary data from the error diffusion processing section 37 and the isolated point removal processing section 39 are applied to a binary-coding output circuit 40. In the binary-coding output circuit 40, the binary data applied in series for each pixel is converted into 8-bit parallel data BIN0 to BIN7 and is outputted. This binary data is applied to the CPU interface 13 shown in FIG. 1.

The input image processing circuit 11 comprises, in addition to the above described components, an address counter 41 for generating a write or read address to the memory 18, and a timing control circuit 42 for controlling operation timing of each component.

Figure 3:
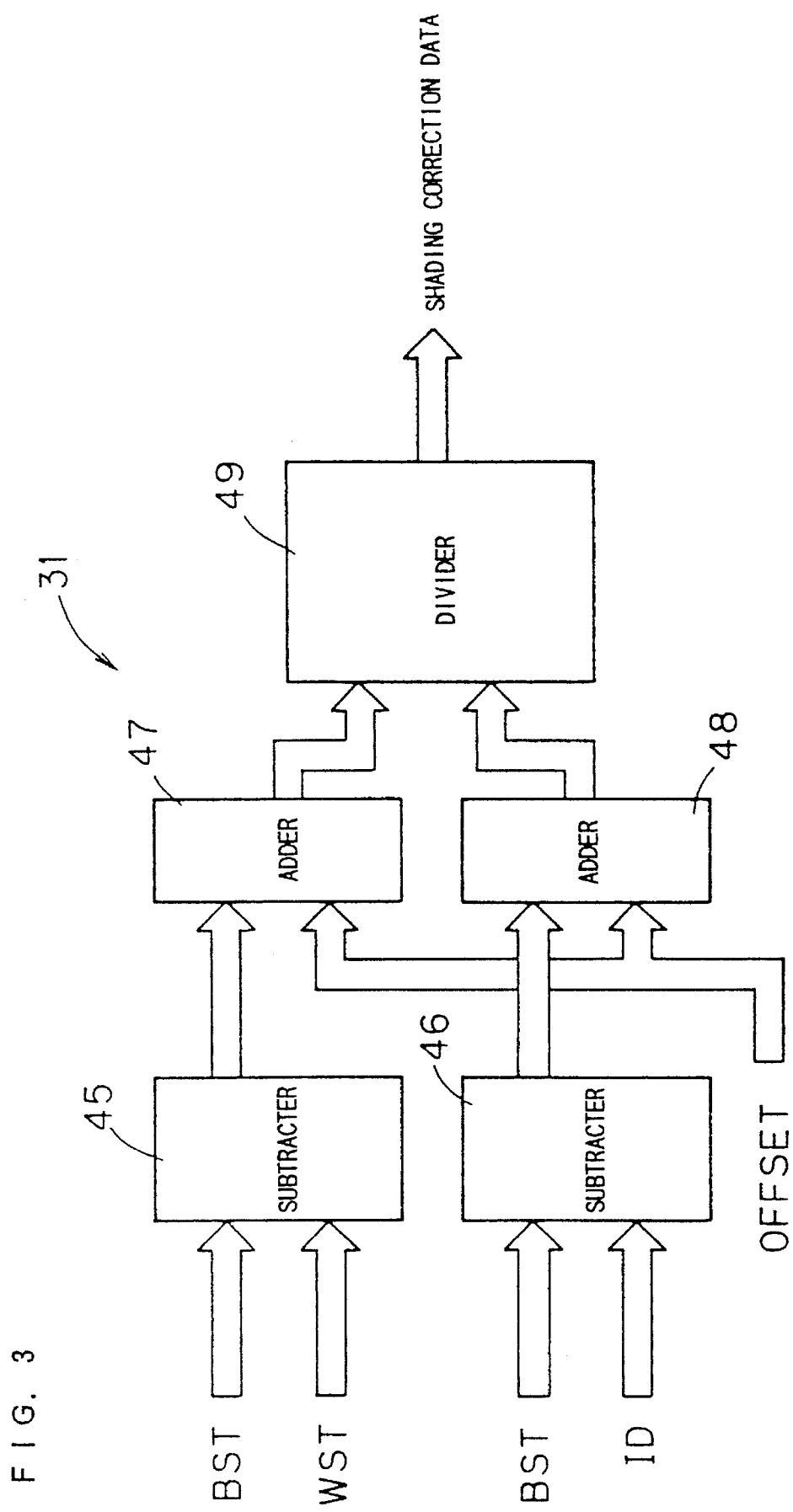
FIG. 3 is a block diagram showing the construction of a shading correcting section.

FIG. 3 is a block diagram showing the internal construction of the shading correcting section 31. White reference data WST, black reference data BST and image data ID are applied to the shading correcting section 31. The difference between the white reference data WST and the black reference data BST (WST−BST) is operated by a first subtracter 45, and the difference between the image data ID and the black reference data BST (ID−BST) is operated by a second subtracter 46. In addition, outputs (WST−BST) and (ID−BST) of the subtracters 45 and 46 are respectively applied to first and second adders 47 and 48, and an offset OFFSET is added to both the outputs.

An output of the adder 47 (WST−BST+OFFSET) and an output of the adder 48 (ID−BST+OFFSET) are applied to a divider circuit 49. This divider circuit 49 carries out division expressed by the following equation (1), to output shading correction data SOUT:

$$SOUT = \frac{ID - BST + OFFSET}{WST - BST + OFFSET} \times K \qquad (1)$$

where K is a constant.

The operation expressed by the equation (1) can be also realized by previously adding the white reference data WST and the offset OFFSET and adding the image data ID and the offset OFFSET, subtracting the black reference data BST from the respective results of the addition, and performing division with respect to the respective results of the subtraction.

The white reference data WST and the black reference data BST are produced in the white/black reference value producing section 32 (see FIG. 2), and are stored in the memory 18. The reference data WST and BST in the memory 18 are read out, and are applied to subtracters 45 and 46.

On the other hand, the offset OFFSET is calculated and is stored in the memory 18 at the same time that the white reference data WST is generated in the white/black reference value producing section 32 as described above, and is supplied to the adders 47 and 38 from a register (not shown). This offset OFFSET is calculated by the following equation (2):

$$\text{OFFSET} = (\text{maximum output of A/D converter}) - \text{WST} \quad (2)$$

Specifically, the difference between the maximum output data of the analog-to-digital converter 17 and the white reference data WST becomes the offset OFFSET. The offset OFFSET is previously added to divisor data (WST−BST) and dividend data (ID−BST) in the division for shading correction, thereby to ensure a wide dynamic range of the shading correction data SOUT.

For example, if in a case where the output data of the analog-to-digital converter 17 is seven bits in depth, the white reference data WST is data having a value of not more than "1111", (ID−BST)/(WST−BST) thereby becoming data substantially represented by not more than four bits. Therefore, the dynamic range of the shading correction data SOUT is liable to be narrowed.

On the other hand, in the present embodiment, the offset OFFSET is added to the divisor data and the dividend data in the operation for shading correction, thereby increasing the number of effective bits to ensure a wide dynamic range. Consequently, the data after shading correction SOUT becomes a representation of the density at a lot of gray levels.

For the offset OFFSET, a predetermined value may be used in place of the value obtained by the calculation using the foregoing equation (2).

Figure 4:
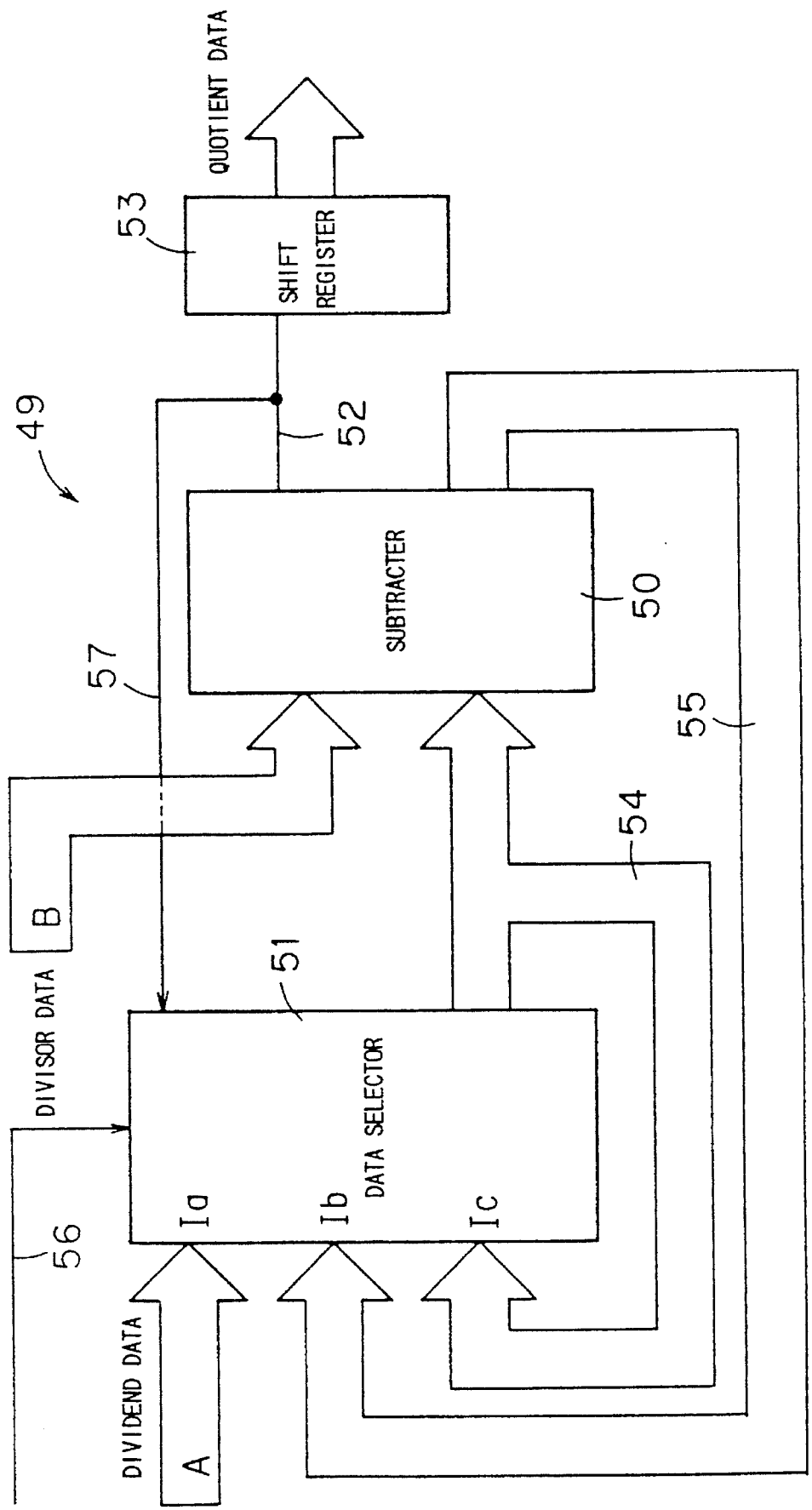
FIG. 4 is a block diagram showing an example of the construction of a dividing circuit.

An example of the construction of the divider circuit 49 is shown in FIG. 4. Specifically, when an operation of A÷B is performed, the divisor data B is applied to one input terminal of a subtracter 50, and the dividend data A is applied to an input terminal Ia of a data selector 51. An output of the data selector 51 is applied to the other input terminal of the subtracter 50. The subtracter 50 subtracts the divisor data B from output data of the data selector 51, and outputs a signal having a logic "1" to a line 52 if the subtraction is possible (the result of the subtraction is not a negative value), while outputting a signal having a logic "0" to the line 52 if the subtraction is impossible. This signal is inputted to a 7-bit shift register 53.

The output of the data selector 51 is shifted higher by one bit, and is fed back to an input terminal Ic of the selector 51 from a line 54. In addition, data representing the result of the subtraction in the subtracter 50 is shifted higher by one bit, and is fed back to an input terminal Ib of the data selector 51 from a line 55.

A selection control signal for selecting the dividend data A applied to the input terminal Ia is applied to the data selector 51 from a line 56. In addition, the signal outputted to the line 52 from the subtracter 50 is applied from a line 57 as a selection control signal for selecting an input signal of either one of the input terminals Ib and Ic. The data selector 51 selects the input data from the input terminal Ib when a signal having a logic "1" is applied from the line 57, while selecting the input data from the input terminal Ic when a signal having a logic "0" is applied from the line 57.

By this construction, the dividend data A from the input terminal Ia is first applied to the subtracter 50. At this time, a signal having a logic "0" is outputted to the line 52 if A−B<0. Data from the input terminal Ic obtained by shifting the dividend data A higher by one bit, is selected and is inputted to the subtracter 50. At this time, if the divisor data B can be subtracted from the data obtained by shifting the dividend data A by one bit, a signal having a logic "1" is outputted to the line 52, so that the data from the input terminal Ib which is obtained by shifting the result of the subtraction higher by one bit is selected by the data selector 51.

Such an operation is repeatedly performed seven times if the dividend data A and the divisor data B are, for example, 7-bit data. As a result, 7-bit data obtained by dividing the dividend data A by the divisor data B is stored in the shift register 53. This 7-bit data is outputted as quotient data.

Figure 5:
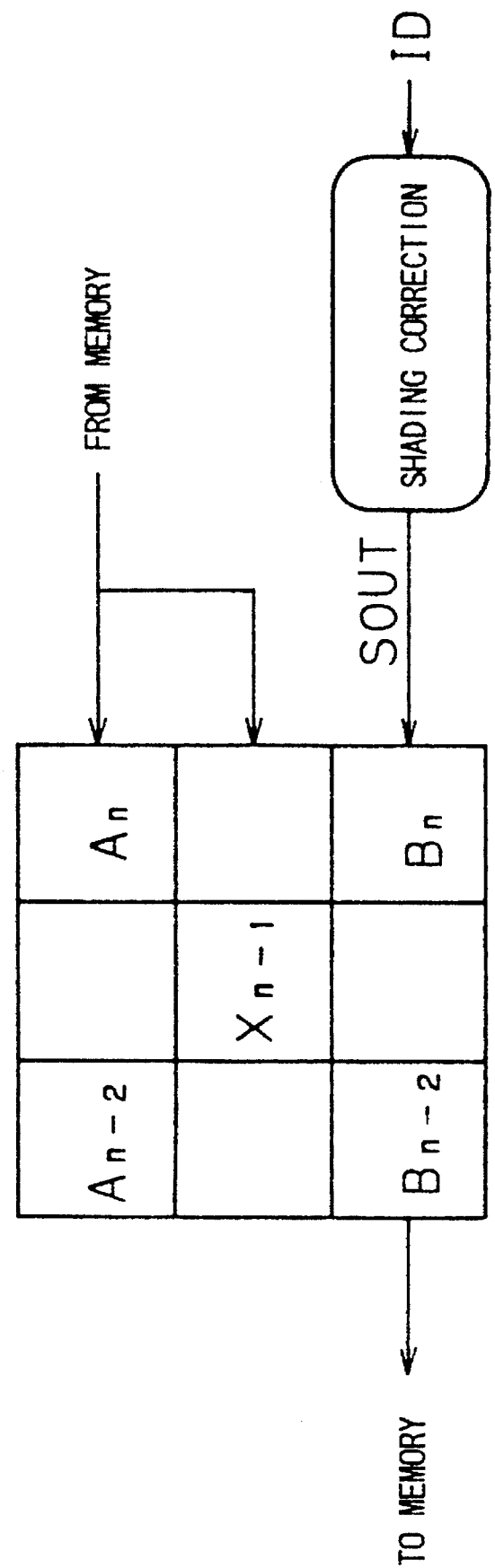
FIG. 5 is a diagram for explaining filtering processing.

FIG. 5 is a diagram for explaining processing performed in the filtering processing section 33. In the present embodiment, a so-called Laplacian filter is adopted. The filtering processing is performed on the basis of data after shading correction corresponding to pixels arranged in a matrix with 3×3 pixels centered with respect to a target pixel.

In order to create a matrix with 3×3 pixels, data corresponding to three lines are required. Specifically, data $B_n$, $B_{n-1}$, $B_{n-2}$, ... corresponding to the present line which are subjected to shading correction and sequentially outputted, data $X_n$, $X_{n-1}$, $X_{n-2}$, ... corresponding to a line one line ahead of the present line to which a target pixel belongs, and data $A_n$, $A_{n-1}$, $A_{n-2}$, ... two lines ahead of the present line are required. In the filtering processing, a differential value S expressed by the following equation (3) is operated.

$$S = 2 \times \frac{1}{4} \{(X_{n-1} - A_{n-2}) + (X_{n-1} - A_n) + \quad (3)$$

$$(X_{n-1} - B_{n-2}) + (X_{n-1} - B_n)\} + R1 + R2 - 1$$

where R1 and R2 are random numbers, i.e., 0 or 1.

Data FOUT after the filtering processing shown in the following table 1 are obtained depending on the operated differential value S. However, data corresponding to each pixel shall be 8-bit data which can have a value in the range of 0 to 255.

TABLE 1

| range of differential value S | contents of processing | data FOUT after filtering processing |
|---|---|---|
| −255 ≦ S < −128 | forced black processing | FOUT = 0 |
| −127 ≦ S < SLB | in case of (X + S) ≦ 0 forced black processing | FOUT = 0 |
| | in case of (X + S) > 0 black emphasis processing | FOUT = (X + S) − 1 |
| SLB ≦ S < SLW | unprocessed (halftone area) | FOUT = X |
| SLW ≦ S < 128 | in case of (X + S) ≦ 128 white emphasis processing | FOUT = (X + S) − 1 |
| | in case of (X + S) > 128 forced white processing | FOUT = 127 |
| 129 ≦ S < 256 | forced white processing | FOUT = 127 |

In the foregoing table 1, X corresponds to the image data $X_{n-1}$ shown in FIG. 5, SLB is a threshold value concerning black pixel emphasis processing, and SWB is a threshold value concerning white pixel emphasis processing.

By the above described processing, a halftone area and a binary image area are detected in a separate manner, so that the binary image area is subjected to processing for emphasizing a white or black color. Consequently, the reproducibility of a binary image is improved.

In the present embodiment, a line memory corresponding to two lines is provided in storage areas in the memory 18 so as to perform filtering processing. This will be described by referring to a memory map in the memory 18 shown in FIG. 6.

Addresses "0000" to "1AFF" in the memory 18 are used for storing data SOUT after shading correction (shading correction data) and black reference data BST and white reference data WST which correspond to two lines. One line is constituted by, for example, 1728 pixels. In addition, addresses "1B00" to "1FFF" are used as a work area, and addresses "2000" to "26BF" are used for error diffusion processing and simple binary-coding processing. Furthermore, addresses "26C0" to "26FF" are used to store a correcting table for gamma correction, and addresses "2700" to "7FFF" are used as a work area in the CPU 14.

In the filtering processing, the addresses "0000" to "1AFF" are used as a line memory corresponding to two lines. Specifically, data after shading correction corresponding to the first pixel related to the main scanning direction in image reading by the image sensor is written in the addresses "0000" and "0001". Data on one of adjacent two lines is stored in the address "0000", and data on the other line is stored in the address "0001". Similarly, data corresponding to the second pixel is stored in the addresses "0004" and "0005", and data corresponding to the third pixel is stored in the addresses "0008" and "0009". In such a manner, it is possible to store data corresponding to pixels belonging to two lines.

For example, data corresponding to a line two lines ahead of the present line shall be written in the addresses "0000", "0004", "0008", "000C", . . . , and data corresponding to a line one line ahead of the present line shall be written in the addresses "0001", "0005", "0009", "000D", . . . For example, if the data on the line two lines ahead of the present line which is written in the address "0008" is read out as data $A_{n-2}$ shown in FIG. 5 and is used for the filtering processing, data $B_{n-2}$ on the present line is written in this address "0008". In the same manner, if the use of data on a pixel belonging to the line two lines ahead of the present line is terminated in the filtering processing, data on the present line is written in place of the data corresponding to the pixel whose use is terminated to a memory address at which the data corresponding to the pixel has been stored.

In such a manner, the filtering processing in which image data corresponding to three lines must be handled can be achieved by preparing a line memory corresponding to two lines. Consequently, it is possible to effectively make use of the storage areas in the memory 18. On the other hand, a device having a small storage capacity can be used as the memory 18, thereby to make it possible to contribute to the decrease in cost.

Meanwhile, image data corresponding to two lines or image data corresponding to not less than four lines may be used for the filtering processing. If the filtering processing is performed on the basis of data corresponding to N (N≧2) lines, a line memory corresponding to (N−1) lines may be prepared in the memory 18, to sequentially read out data corresponding to pixels belonging to (N−1) lines just ahead of the present line from the memory and write data corresponding to the present line to addresses from which data corresponding to a line (N−1) lines ahead of the present line have been read out. Consequently, the filtering processing requiring data corresponding to N lines can be achieved by preparing a memory corresponding to (N−1) lines.

Figure 7:
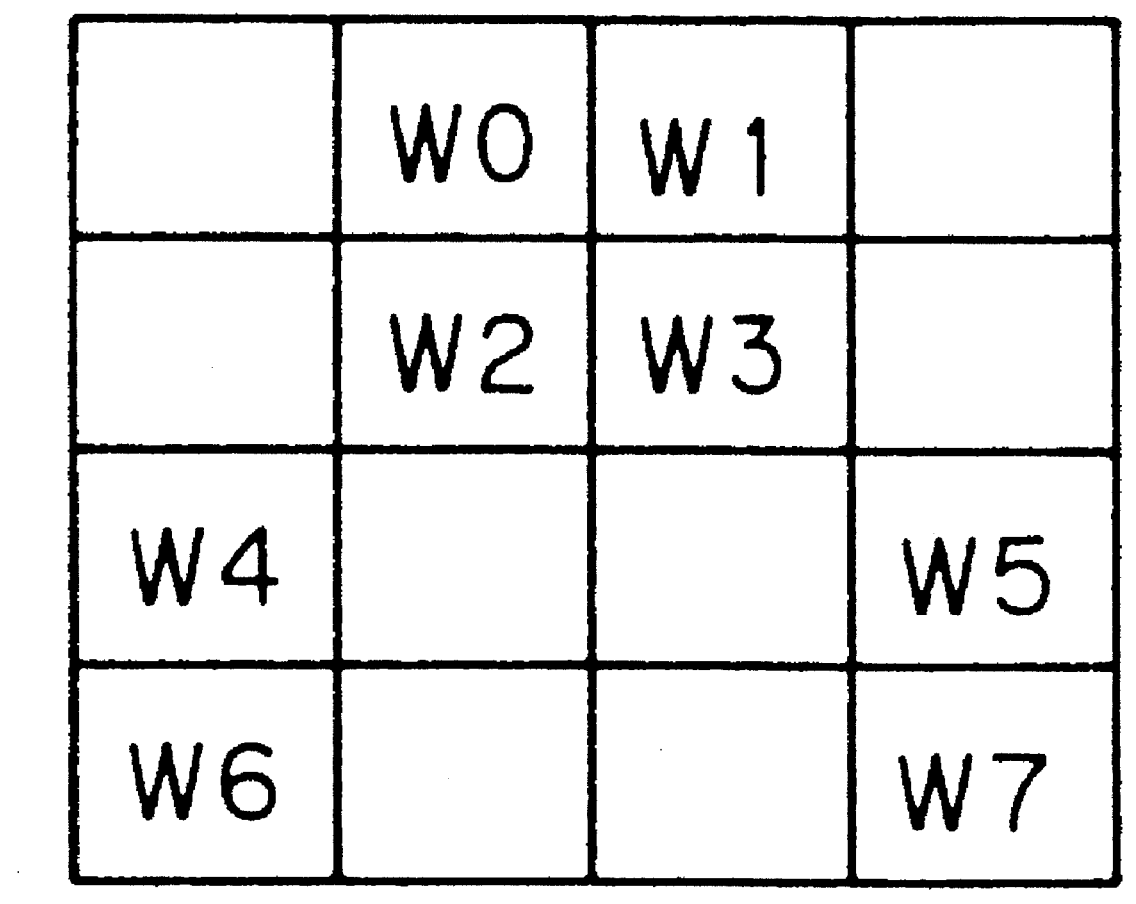

FIG. 7 is a diagram for explaining processing in the density adjustment processing section 34. The density adjustment processing section 34 sequentially takes out partial images each comprising 16 pixels arranged in a matrix with 4×4 pixels, and adds or subtracts predetermined density correcting values to or from pixels W0, W1, W2, . . . , W7 in predetermined pixel positions in this matrix.

For example, the density correcting values which are added to the pixels W0, W1, . . . , W7 are respectively taken as WD0, WD1, . . . , WD7, and the following equation shall hold:

$$WD0=WD1=WD2= \ldots =WD7=3 \qquad (4)$$

Figure 8:
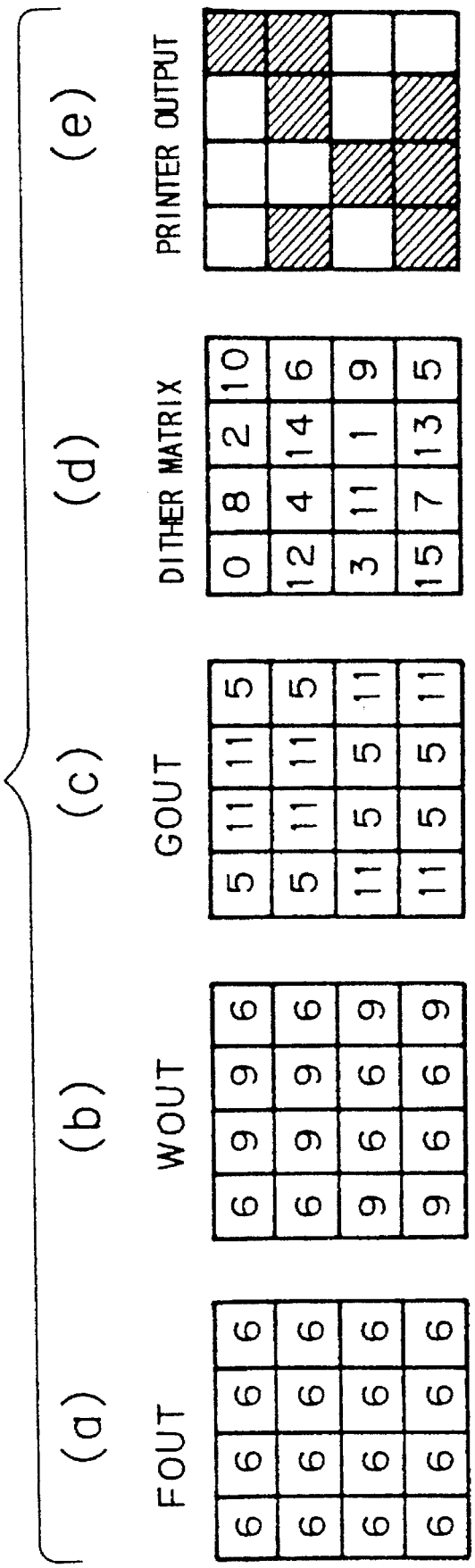

At this time, if image data FOUT after filtering processing corresponding to the pixels arranged in the matrix with 4×4 pixels are as shown in FIG. 8(*a*), the data are changed into data WOUT shown in FIG. 8(*b*).

Figure 9:
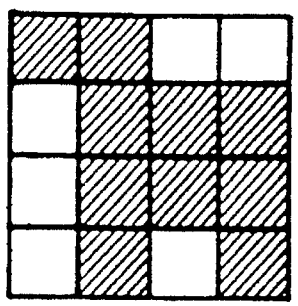

Addition of the density correcting value WDi (0≦i≦7) to the image data may be performed under predetermined conditions. For example, if the following expression is a condition for addition, image data FOUT after filtering processing as shown in FIG. 9(*a*) are converted into data WOUT as shown in FIG. 9(*b*):

$$FOUT>0 \qquad (5)$$

Specifically, the density correcting value WDi is not added to a pixel corresponding to the data FOUT whose value is zero.

Furthermore, a different condition may be established for each pixel position in the matrix to add to a pixel corresponding to the data FOUT satisfying the condition in its pixel position the density correcting value WDi corresponding to the pixel position.

Figure 10:
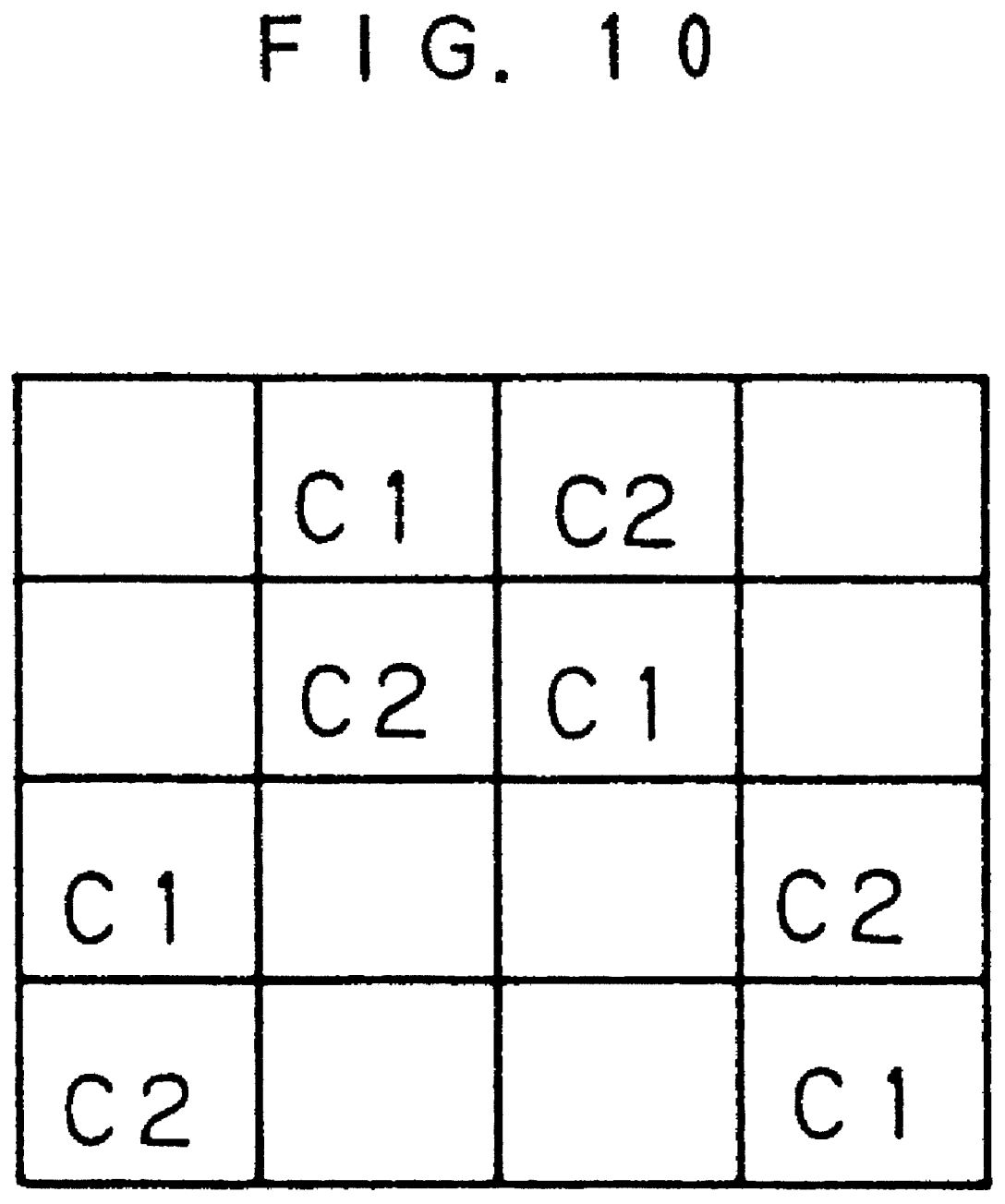

For example, as shown in FIG. 10, the following condition C1 is established with respect to the pixels W0, W3, W4 and W7 in the matrix, and the following condition C2 is established with respect to the pixels W1, W2, W5 and W6:

$$\text{Condition C1} \ldots \text{FOUT>WMIN=0} \qquad (6)$$

$$\text{Condition C2} \ldots \text{FOUT>WMAX=8} \qquad (7)$$

Figure 11:
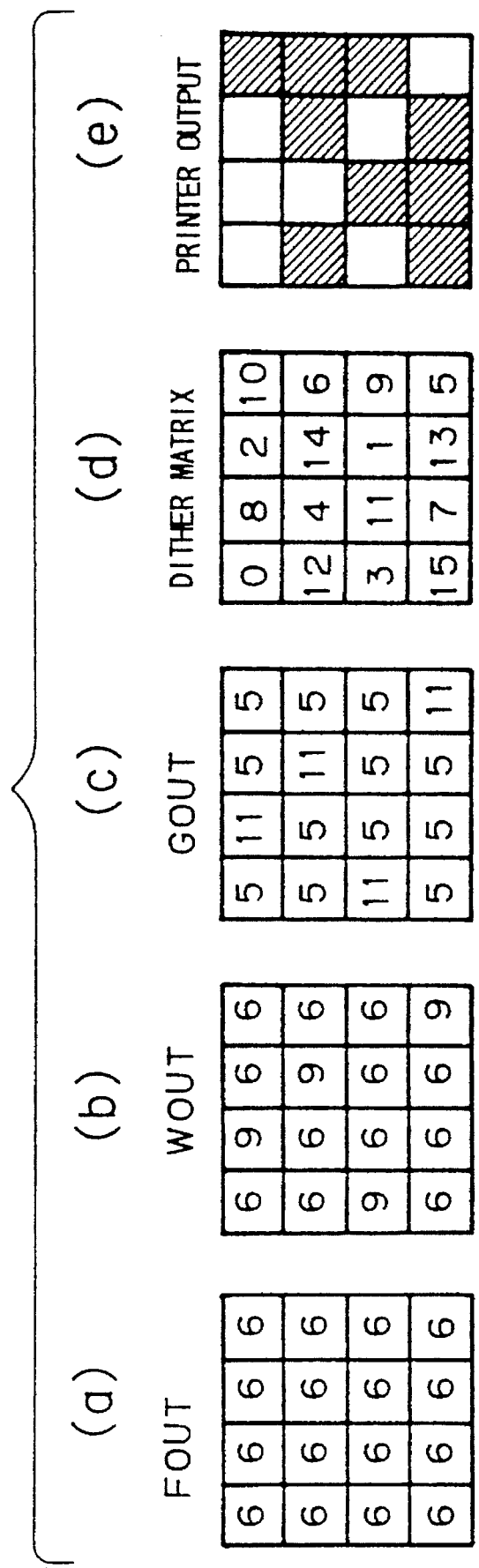

Let's add to a pixel satisfying the condition C1 or C2 established for its pixel position the density correcting value WDi corresponding to the pixel position. In this case, image data FOUT after filtering processing as shown in FIG. 11(*a*) are converted into data WOUT as shown in FIG. 11(*b*). That is, only the condition C1 holds in this case.

All the density correcting values WDi need not be equal to each other. Alternatively, a different density correcting value may be set for each pixel position.

Figure 12:
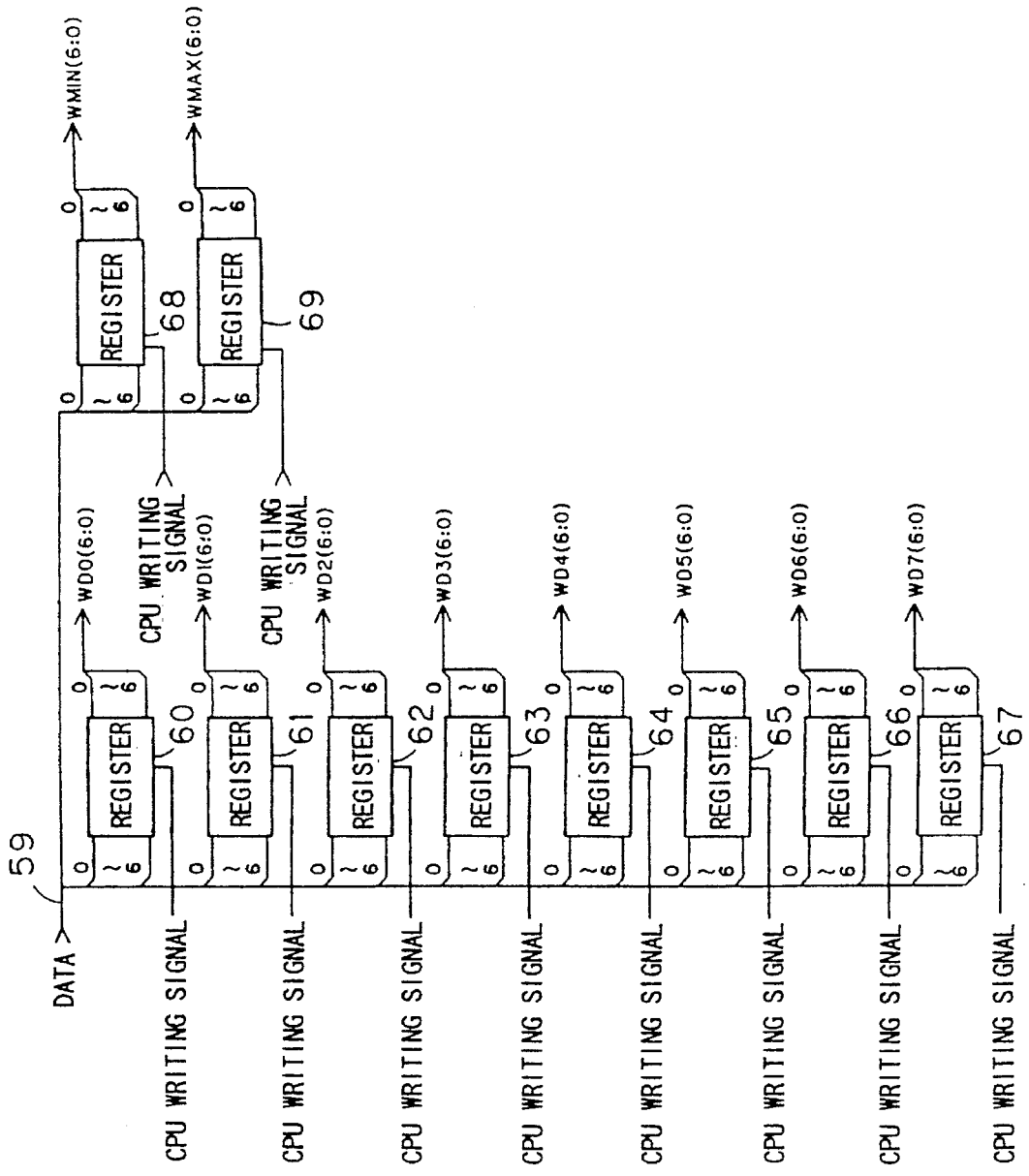
FIG. 12 is a block diagram showing an example of the construction of a density adjustment processing section.

FIG. 12 is a block diagram showing an example of the construction for performing the above described density adjustment processing. Density correcting values WD0 to WD7 are previously stored in the memory 18. The density correcting values are outputted to a data bus 59 by the CPU 14. The density correcting values WD0, WD1, . . . , WD7 are respectively written to registers 60, 61, . . . , 67 by a writing signal from the CPU 14.

On the other hand, threshold value data WMIN and WMAX for conditioning are respectively written to registers 68 and 69 through the data bus 59. By this construction, the density correcting values WD0, WD1, WD2, . . . , WD7 are respectively added to the image data corresponding to the pixels W0, W1, W2, . . . , W7 in the matrix with 4×4 pixels (see FIG. 7).

If addition is conditionally performed, the data corresponding to the pixels W0, W1, W2, . . . , W7 which are to be subjected to the addition and output data of the registers 68 and 69 may be compared with each other, to determine whether or not the addition will be performed depending on the result of the comparison.

Figure 13:
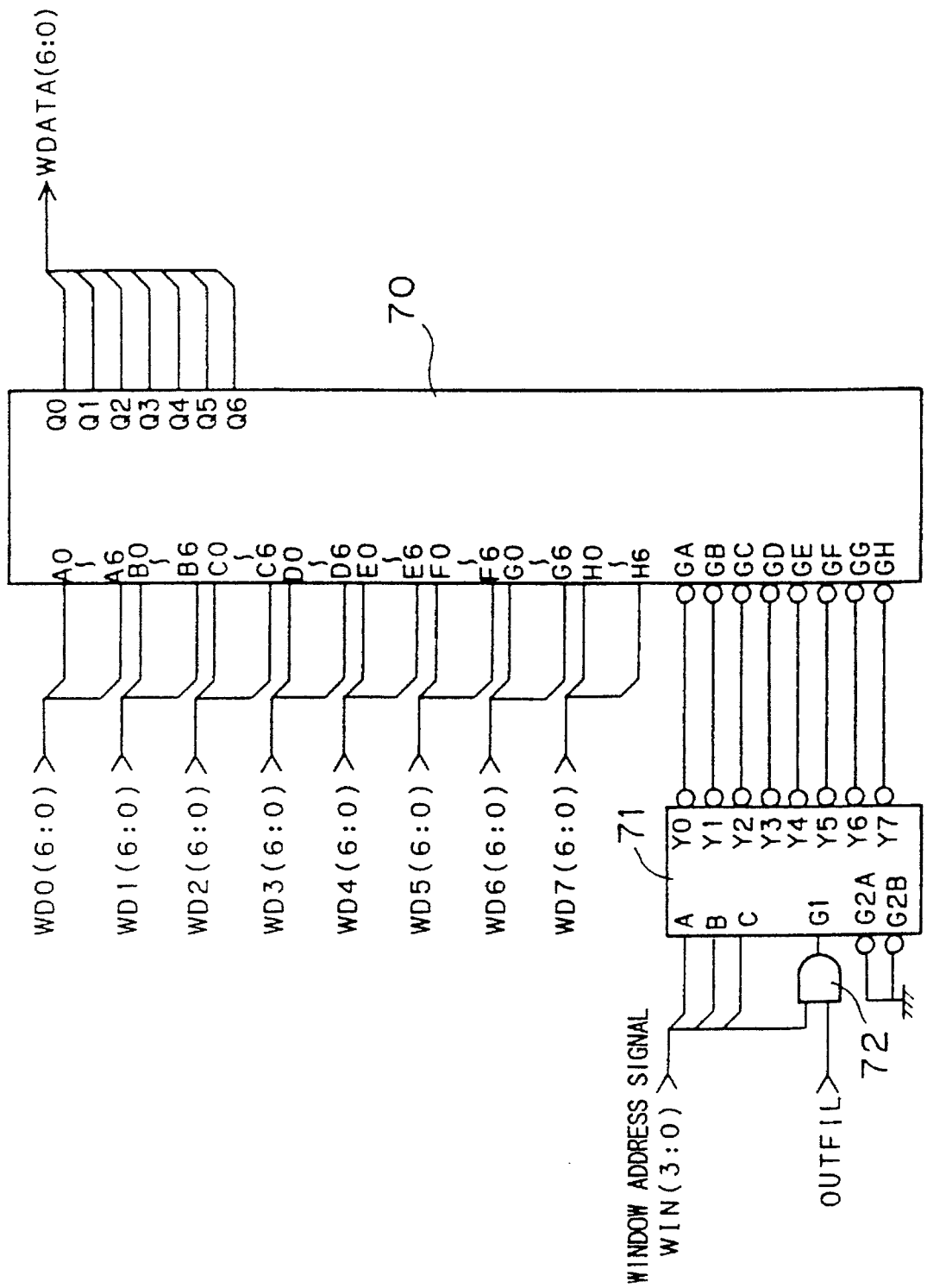
FIG. 13 is a block diagram showing another example of the construction of a density adjustment processing section.

FIG. 13 is a block diagram showing another example of the construction for density adjustment processing. In this construction, density correcting values WD0, WD1, . . . , WD7 are inputted to a multiplexer 70, and any one of the density correcting values WDi is outputted as density correction data WDATA from output terminals Q0 to Q6 of the multiplier 70.

A selection control signal for selecting density correcting values WDi to be outputted is applied to the multiplexer 70 from a line decoder 71. This line decoder 71 has eight output terminals Y0 to Y7, and outputs a low-level signal to any one of the output terminals corresponding to the density correcting value WDi to be selected. If the addition is not performed, all the output terminals Y0 to Y7 attain a high level.

In this example of the construction, a predetermined 4-bit address is applied to each of the pixel positions in the matrix with 4×4 pixels, and a signal corresponding to the lower three bits of this address is inputted to input terminals A, B and C of the line decoder 71. The most significant bit of the above described address is applied to an input terminal G1 of the line decoder 71 through an AND gate 72. A signal OUTFIL for choosing whether to make density a adjustment is also inputted to the AND gate 72.

If a low-level signal is applied to the input terminal G1, the line decoder 71 outputs a high-level signal to all the output terminals Y0 to Y7. When the most significant bit of the address is "0" or the signal OUTFIL is at a low level, output data of the multiplexer 70 becomes "0". Accordingly, addition of the density correcting value WDi is not performed at this time.

FIG. 14 is a diagram showing a 4-bit address applied to each of the pixels in the matrix with 4×4 pixels. Specifically, the most significant bit of the address is "1" with respect to the pixels W0, W1, . . . , W7 shown in FIG. 7 to which the density correcting value WDi is to be added, while being "0" with respect to the remaining pixels. Therefore, the density correcting value WDi is added only to the pixels W0, W1, . . . , W7. By the lower three bits of the address, the density correcting values WD0 to WD7 corresponding to the respective pixels W0 to W7 are selected and are outputted as the density correction data WDATA.

In the density adjustment processing section 34, the position in the matrix with 4×4 pixels of a target pixel is detected. The address shown in FIG. 14 corresponding to the result of the detection is generated, to be inputted to the input terminals A, B and C of the line decoder 71 and the AND gate 72.

Figure 15:
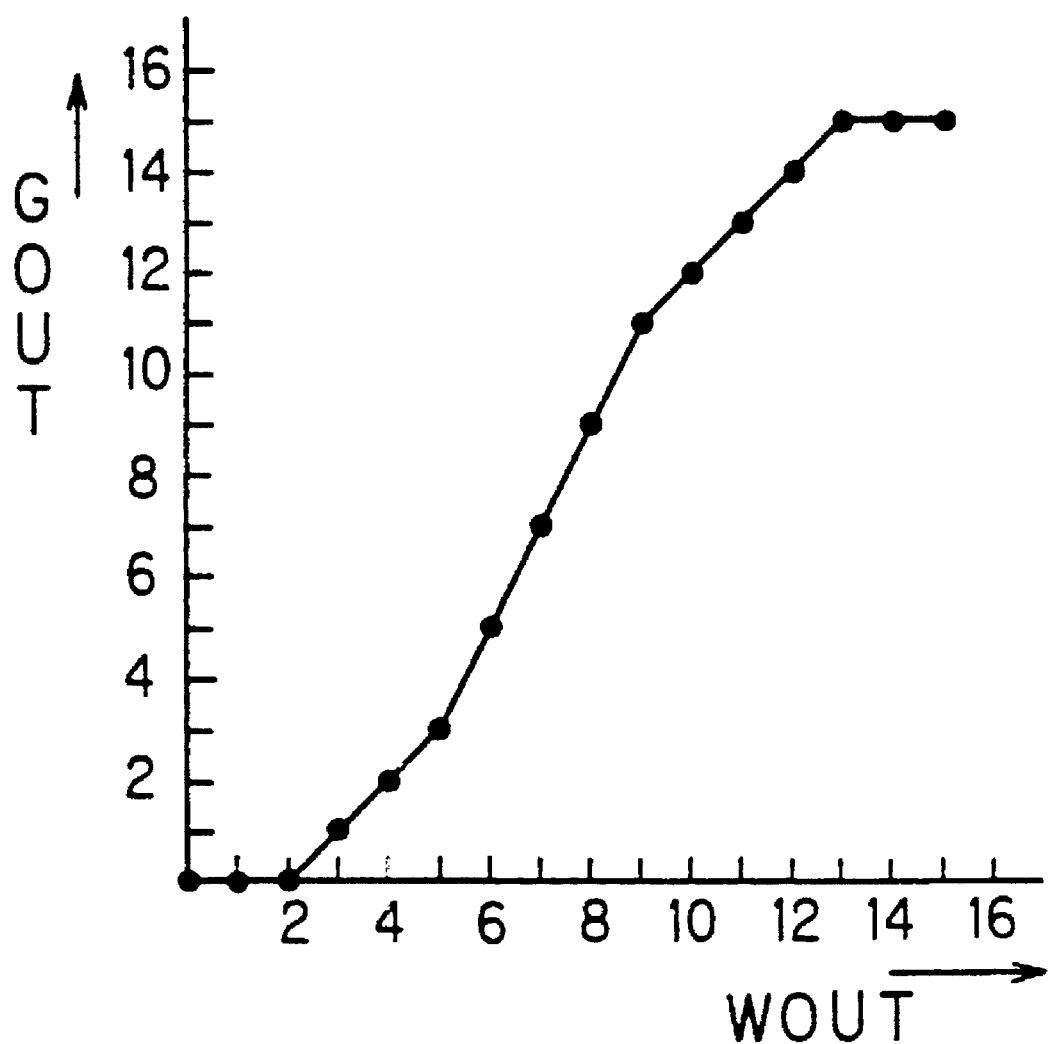
FIG. 15 is a diagram for explaining gamma correction processing.

FIG. 15 is a diagram for explaining processing in the gamma correcting section 35. The contents of the gamma correcting table (see FIG. 6) stored in the memory 18 are as shown in the following table 2. A gamma curve obtained by graphing the gamma correcting table is shown in FIG. 15. In the table, "H" indicates that a numeral ahead of "H" is a hexadecimal number.

TABLE 2

| address (WOUT) | gamma table (GOUT) |
|---|---|
| * * 0 0 H | 0 0 H |
| * * 0 1 H | 0 0 H |
| * * 0 2 H | 0 0 H |
| * * 0 3 H | 0 1 H |
| * * 0 4 H | 0 2 H |
| * * 0 5 H | 0 3 H |

TABLE 2-continued

| address (WOUT) | gamma table (GOUT) |
|---|---|
| * * 0 6 H | 0 5 H |
| * * 0 7 H | 0 7 H |
| * * 0 8 H | 0 9 H |
| * * 0 9 H | 0 B H |
| * * 0 A H | 0 C H |
| * * 0 B H | 0 D H |
| * * 0 C H | 0 E H |
| * * 0 D H | 0 F H |
| * * 0 E H | 0 F H |
| * * 0 F H | 0 F H |

When gamma correction is made, the data WOUT from the density adjustment processing section 34 is assigned to the lower two digits of an address in the gamma correcting table. A value stored at the address is read out from the memory 18 as data GOUT after gamma correction, thereby achieving gamma correction.

For example, the data WOUT after density adjustment processing in the matrix with 4×4 pixels shown in FIG. 8(b) are subjected to gamma correction, thereby obtaining data GOUT after gamma correction 1 as shown in FIG. 8(c). Similarly, the WOUT after density adjustment processing shown in FIG. 9(b) and FIG. 11(b) are subjected to gamma correction, to respectively obtain image data GOUT shown in FIG. 9(c) and FIG. 11(c).

The respective data GOUT shown in FIGS. 8(c), 9(c) and 11(c) are subjected to halftone processing using a dither matrix respectively shown in FIGS. 8(d), 9(d) and 11(d), thereby to respectively obtain binary images shown in FIGS. 8(e), 9(e) and 11(e). A hatched portion indicates a black pixel.

In the binary images shown in FIGS. 8(e), 9(e) and 11(e), white pixels and black pixels are mixed with each other in a proper ratio. Accordingly, it is possible to overcome, for example, the problem that the white pixel is defaced by the black pixels in the vicinity of the white pixel. This is particularly effective when the black pixel spreads due to the spread of toner particles when an image is printed by, for example, a laser beam printer.

It is from the result of the density adjustment processing in the density adjustment processing section 34 that a proper ratio of the white pixels to the black pixels is obtained in the image after halftone processing as described above. If the adjustment in the density adjustment processing section 34 is omitted, the density of a halftone image may be insufficiently reproduced.

More specifically, the density data corresponding to the pixels constituting the partial image shown in FIG. 8(a) all have an intermediate value "6". Consequently, if the density data corresponding to each of the pixels constituting the partial image is directly subjected to gamma correction, all the pixels are converted into the same value. Consequently, this case is not substantially different from a case where only halftone processing using a dither matrix is performed, so that an intermediate density may be insufficiently reproduced.

On the other hand, if density adjustment processing according to the present embodiment is performed, the density data can be varied, as shown in FIG. 8(b). Therefore, so-called gamma correction for representing an intermediate density for each partial image constituting a matrix with 4×4 pixels is made, thereby making it possible to sufficiently reproduce the intermediate density.

In this case, if addition of the density correcting value WDi is performed under the condition given by the foregoing expression (5) as in the processing shown in FIG. 9, density data corresponding to a pixel which is clearly a black pixel can be prevented from being corrected to data having an intermediate value, thereby making the reproducibility of the density better.

Furthermore, if a different condition is established for each pixel position to perform density adjustment processing as in the processing shown in FIG. 11, the range in which the reproduction of the density is adjusted becomes wider, thereby making it possible to reproduce the density more sufficiently.

Figure 16:
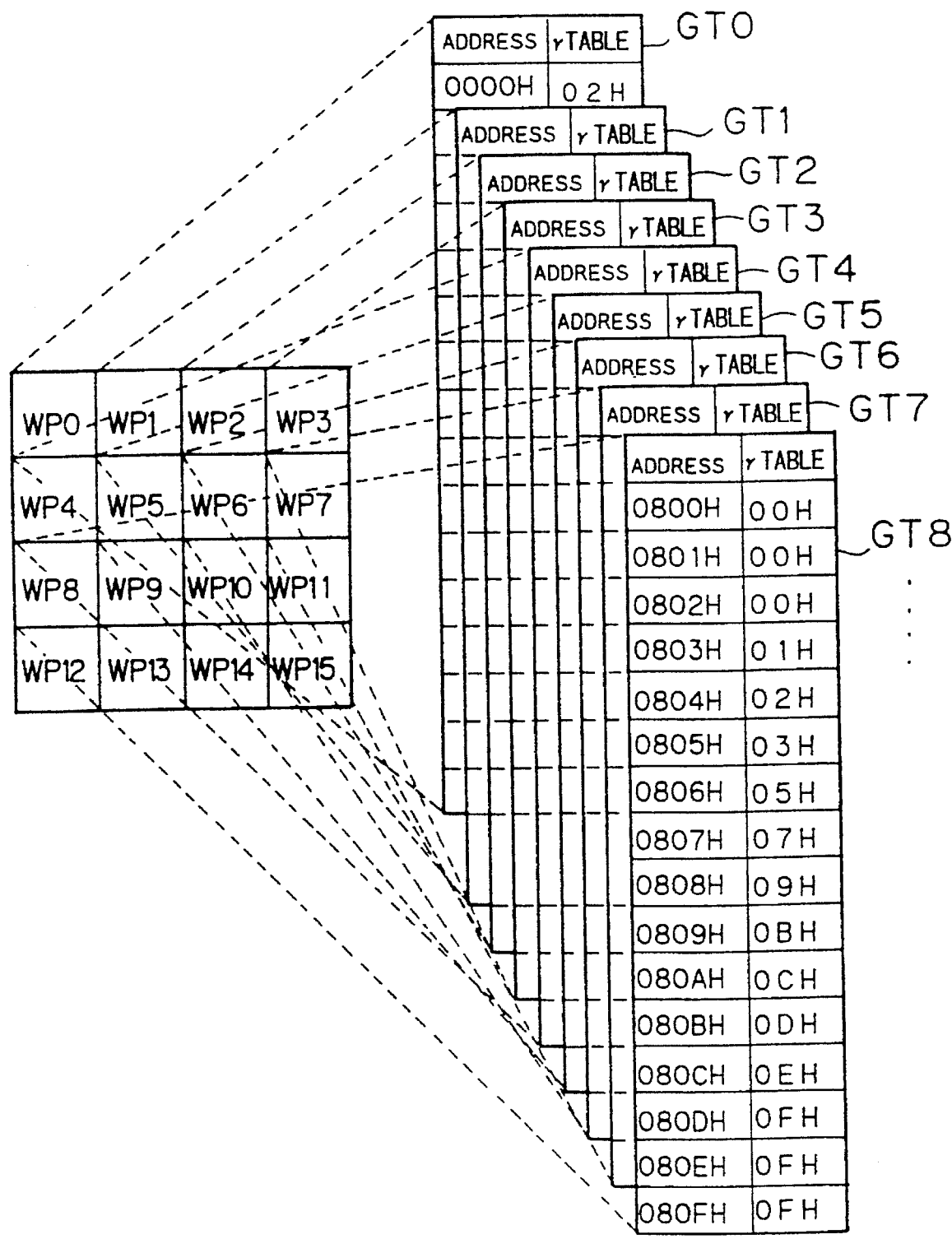
FIG. 16 is a diagram for explaining another technique for density adjustment processing and gamma correction processing.

FIG. 16 is a diagram for explaining another processing technique for density adjustment processing and gamma correction processing. In this example, gamma correcting tables GT0, GT1, GT2, GT3 . . . , GT5 (only gamma correcting tables GT0 to GT8 are illustrated in FIG. 16 so as to avoid complexity) are respectively provided for pixel positions WP0, WP1, WP2, . . . , WP15 in a matrix with 4×4 pixels for density adjustment. For image data FOUT after filtering processing corresponding to the 4×4 pixels which are to be subjected to density adjustment processing, a different gamma correcting table is referred to depending on the position in the matrix of the pixel.

In the example shown in FIG. 16, "00H" to "0FH" corresponding to the pixel positions WP0, WP1, WP2, . . . , WP15 are assigned to the respective upper two digits of addresses in the gamma correcting table, and data after filtering processing are assigned to the respective lower two digits. If the image data FOUT after filtering processing corresponding to, for example, the pixel position WP8 is "06H", data "05H" stored at an address "0806H" is obtained as data GOUT after gamma correction.

The relationship among the gamma correcting tables GT0 to GT15 is such that the results of such density adjustment as to add the density correcting values WD1 to WD7 to, for example, the pixels W0 to W7 in the matrix with 4×4 pixels shown in FIG. 7 and as not to perform addition processing with respect to the remaining pixels in the matrix and gamma correction with respect to data after the density adjustments are obtained.

By such construction, the above described density adjustment processing and gamma correction processing can be performed at a stretch.

Figure 17:
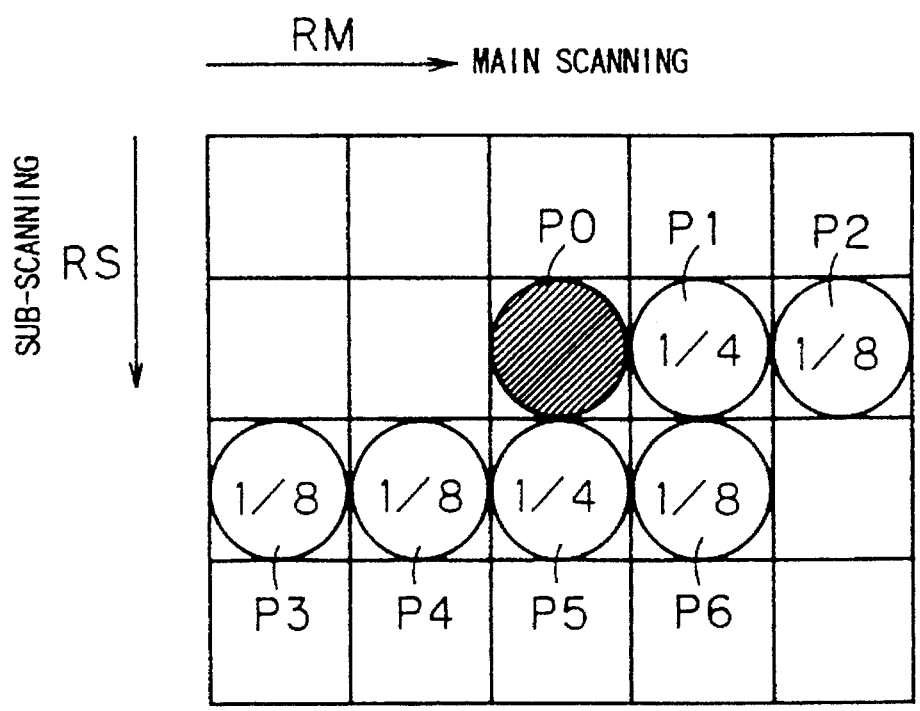
FIG. 17 is a diagram for explaining error diffusion processing.

FIG. 17 is a diagram for explaining processing in the error diffusion processing section 37. Error diffusion processing is processing for finding, when a given pixel P0 is binary-coded, an error HG between multivalued density data corresponding to the pixel P0 and density data after binary-coding (density data corresponding to a white or black color) and distributing this error HG to pixels in the vicinity of the pixel P0 in a predetermined ratio. For example, if the multivalued density data after binary-coding processing corresponding to the pixel P0 is "30H" and a binary-coding threshold value is "20H", the pixel P0 becomes a white pixel. At this time, if the density of a pure white pixel is "3F", a binary-coded error HG is as follows:

$$HG = 3FH - 30H = FH \quad (8)$$

In the present embodiment, the binary-coded error HG produced in the pixel P0 is multiplied by a coefficient ¼ and distributed to pixels P1 and P5 respectively adjacent to the pixel P0 on the downstream side in the main scanning direction RM and the subscanning direction RS at the time of reading an image by the image sensor 15. In addition, the binary-coded error HG is multiplied by a coefficient ⅛ and distributed to a pixel P2 adjacent to the pixel P1 on the downstream side in the main scanning direction RM, two pixels P3 and P4 adjacent to the pixel P5 on the upstream side in the main scanning direction RM, and a pixel P6 adjacent to the pixel P5 on the downstream side in the main scanning direction RM.

Figure 18:
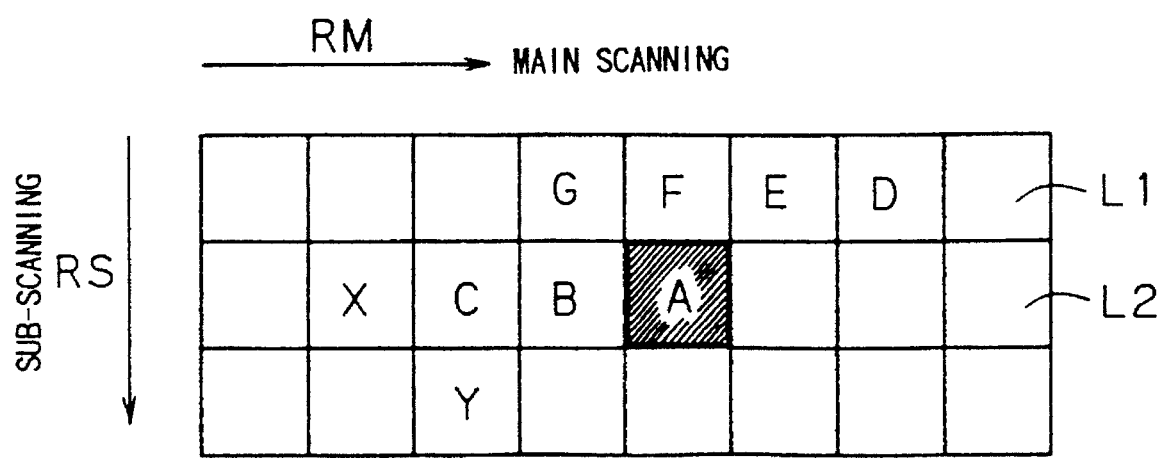
FIG. 18 is a diagram for explaining error diffusion processing.

In the error diffusion processing with respect to a target pixel, errors distributed from pixels in the vicinity of the target pixel are added to density data corresponding to the target pixel, and the target pixel is subjected to binary-coding processing on the basis of the result of the addition. This processing will be described with reference to FIG. 18.

Consideration is given with respect to a centered target pixel A. Binary-coded errors HG (G), HG (E) and HG (D) in pixels G, E and D belonging to the preceding line L1 are multiplied by a coefficient ⅛ and distributed to the target pixel A. In addition, a binary-coded error HG (F) in a pixel F is multiplied by a coefficient ¼ and distributed to the target pixel A. With respect to the present line L2 including the target pixel A, a binary-coded error HG (B) in a pixel B adjacent to the target pixel A on the upstream side in the main scanning direction RM is multiplied by a coefficient ¼ and distributed to the target pixel A, and a binary-coded error HG (C) in a pixel C on the upstream side of the pixel B in the main scanning direction RM is multiplied by a coefficient ⅛ and distributed to the target pixel A.

If data applied from the gamma correcting section 35 with respect to the target pixel A is GOUT (A), binary-coding processing with respect to the target pixel A is performed by comparing a value T (A) expressed by the following equation (9) with a predetermined threshold value:

$$T(A) = GOUT(A) + \frac{1}{4} \{HG(F) + HG(B)\} + \quad (9)$$

$$\frac{1}{8} \{HG(G) + HG(E) + HG(D) + HG(C)\}$$

The specific procedure for such error diffusion processing is as follows. The error diffusion processing performed in the present embodiment is constituted by following [processing 1] to [processing 6].

[Processing 1]

A binary-coded error HG (B) produced in processing with respect to a pixel B one pixel ahead of a target pixel A and a binary-coded error HG (C) produced in processing with respect to a pixel C two pixels ahead of the target pixel A are respectively multiplied by coefficients corresponding to the positional relationships with the target pixel A and are added to each other, to operate an accumulated error RG (h) expressed by the following equation (10):

$$RG(h) = \frac{1}{4} HG(B) + \frac{1}{8} HG(C) \quad (10)$$

[Processing 2]

An accumulated error RG (m) on the preceding line L1 expressed by the following equation (11) and the accumulated error RG (h) found in the [processing 1] are added to each other, to find an accumulated error RG (i) which is to be added to data corresponding to the target pixel A using an operation expressed by the following equation (12). The accumulated error RG (m) is stored in the memory 18 by following [processing 6] which has been already terminated with respect to a pixel belonging to the preceding line L1. This accumulated error RG (m) has been stored in the memory 18 (see FIG. 6).

$$RG(m) = \frac{1}{8} HG(G) + \frac{1}{4} HG(F) + \frac{1}{8} HG(E) + \frac{1}{8} HG(D) \quad (11)$$

-continued $$RG\ (i) = RG\ (m) + RG\ (h) \quad (12)$$

[Processing 3]

Data GOUT (A) after Gamma correction corresponding to the target pixel A and the accumulated error RG (i) found in [processing 2] are added to each other, to find a value T (A) which is to be subjected to binary-coding judgment. This value T (A) becomes a value expressed by the following equation (13):

$$T(A)=GOUT(A)+RG(i) \quad (13)$$

[Processing 4]

The above described value T (A) which is to be subjected to binary-coding judgment and a binary-coding threshold value are compared with each other, to find a binary-coded error HG (A) at the time of binary-coding judgment. Since data corresponding to the density of a pure white pixel and data corresponding to the density of a deep black pixel have been previously found, it is possible to find a binary-coded error HG (A) in the target pixel A if the value T (A) which is to be subjected to binary-coding judgment and the binary-coding threshold value are compared with each other.

[Processing 5]

An accumulated error RG (j) found in the foregoing [processing 1] in error diffusion processing in which the pixel B one pixel ahead of the target pixel A is considered as a target pixel is added to an error diffusion coefficient ⅛ times the found binary-coded error HG (A) in the target pixel A, and a value obtained by the addition is taken as an accumulated error RG (k). The accumulated error RG (j) is expressed by the following equation (14) using a binary-coded error HG (X) produced in error diffusion processing with respect to a pixel X just ahead of the pixel C:

$$RG\ (j) = \frac{1}{4}\ HG\ (C) + \frac{1}{8}\ HG\ (X) \quad (14)$$

Consequently, the accumulated error RG (k) is expressed by the following equation (15):

$$\begin{aligned} RG\ (k) &= \frac{1}{8}\ HG\ (A) + RG\ (j) \\ &= \frac{1}{8}\ HG\ (A) + \frac{1}{4}\ HG\ (C) + \frac{1}{8}\ HG\ (X) \end{aligned} \quad (15)$$

[Processing 6]

An error diffusion coefficient ⅛ times the binary-coded error RG (B) in the pixel B just ahead of the target pixel A is added to the above described accumulated error RG (k), to find an accumulated error RG (n) expressed by the following equation (16):

$$\begin{aligned} RG\ (n) &= \frac{1}{8}\ HG\ (B) + RG\ (k) \\ &= \frac{1}{8}\ HG\ (X) + \frac{1}{4}\ HG\ (C) + \frac{1}{8}\ HG\ (B) + \frac{1}{8}\ HG\ (A) \end{aligned} \quad (16)$$

This accumulated error RG (n) is written to an address corresponding to the target pixel A in the memory 18 so as to be used for processing with respect to a pixel Y belonging to the succeeding line. The written value is used in the foregoing [processing 2] when the pixel Y becomes a target pixel.

The [processing 1] to the [processing 6] are performed every time a target pixel is switched, so that error diffusion processing is achieved, thereby performing pseudo halftone processing.

As described in the foregoing, in the error diffusion processing according to the present embodiment, the accumulated error RG (n) is previously stored in the memory 18 to correspond to the target pixel A, and this accumulated error RG (n) is used for the error diffusion processing with respect to the pixel Y having a predetermined positional relationship with the target pixel A which belongs to the succeeding line. In order to perform the error diffusion processing with respect to the pixel Y, if the accumulated error RG (n) is read out instead of individually reading out binary-coded errors in the pixels G, F, E and D from the memory 18, the reading of the data corresponding to the pixels belonging to the line L2 which is a line preceding the line to which the pixel Y belongs is completed. Consequently, the number of times of access to the memory 18 is small, thereby making it possible to perform the error diffusion processing at high speed.

Figure 19:
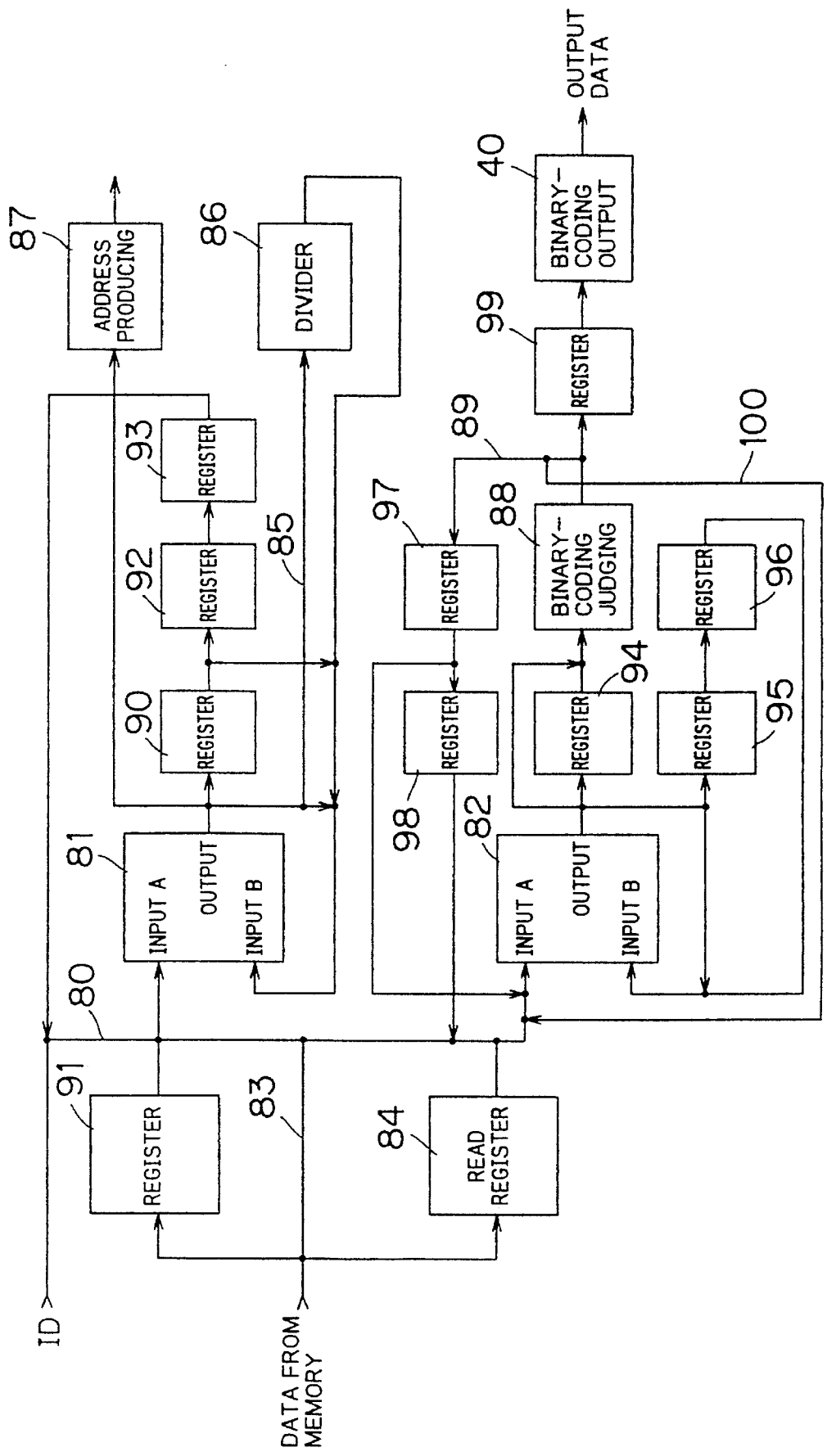
FIG. 19 is a block diagram showing the hardware construction for performing processing with respect to a halftone image.

FIG. 19 is a block diagram showing the specific hardware construction which realizes the above described shading correction, filtering processing, density adjustment processing, gamma correction processing and error diffusion processing together. The gamma correction processing and the error diffusion processing are performed with respect to only a halftone image. Accordingly, the construction shown in FIG. 19 is construction for performing data processing with respect to a halftone image.

7-bit image data ID from the analog-to-digital converter 17 (see FIG. 1) is applied to respective input terminals A of a first adder 81 and a second adder 82 from a line 80. Data from the memory 18 is also inputted to the input terminals A of the adders 81 and 82 from a line 83, and data from the memory 18 which is held once in a register 91 is also applied thereto. The data read out from the memory 18 is also held in a read register 84, and the contents of the read register 84 can be applied to the input terminals A of the adders 81 and 82.

An output of the first adder 81 is fed back to the input terminal A of the adder 81 through registers 90, 92 and 93, and is directly fed back to an input terminal B of the adder 81. In addition, the output of the first adder 81 is also applied to a divider circuit 86 from a line 85. An output of the divider circuit 86 is applied to the input terminal B of the first adder 81.

The output of the first adder 81 is also applied to an address producing section 87 for producing an address in the memory 18.

On the other hand, an output of the second adder 82 is inputted to a binary-coding judging circuit 88 for binary-coding judgment in the error diffusion processing through a register 94. Binary data outputted from this binary-coding judging circuit 88 is inputted to a binary-coding output circuit 40 (see FIG. 2) through a register 99. In addition, a binary-coded error produced at the time of binary-coding is outputted to a line 89 from the binary-coding judging circuit 88, and this error is applied to the input terminal A of the second adder 82 through registers 97 and 98. The binary-coded error can be also inputted to the input terminal A of the second adder 82 from the register 97 and a line 100.

The output of the second adder 82 is also directly fed back to an input terminal B of the adder 82. In addition, this output is fed back to the input terminal B of the adder 82 through registers 95 and 96. Furthermore, the output of the second adder 82 is also applied to the binary-coding judging circuit 88.

Figure 20:
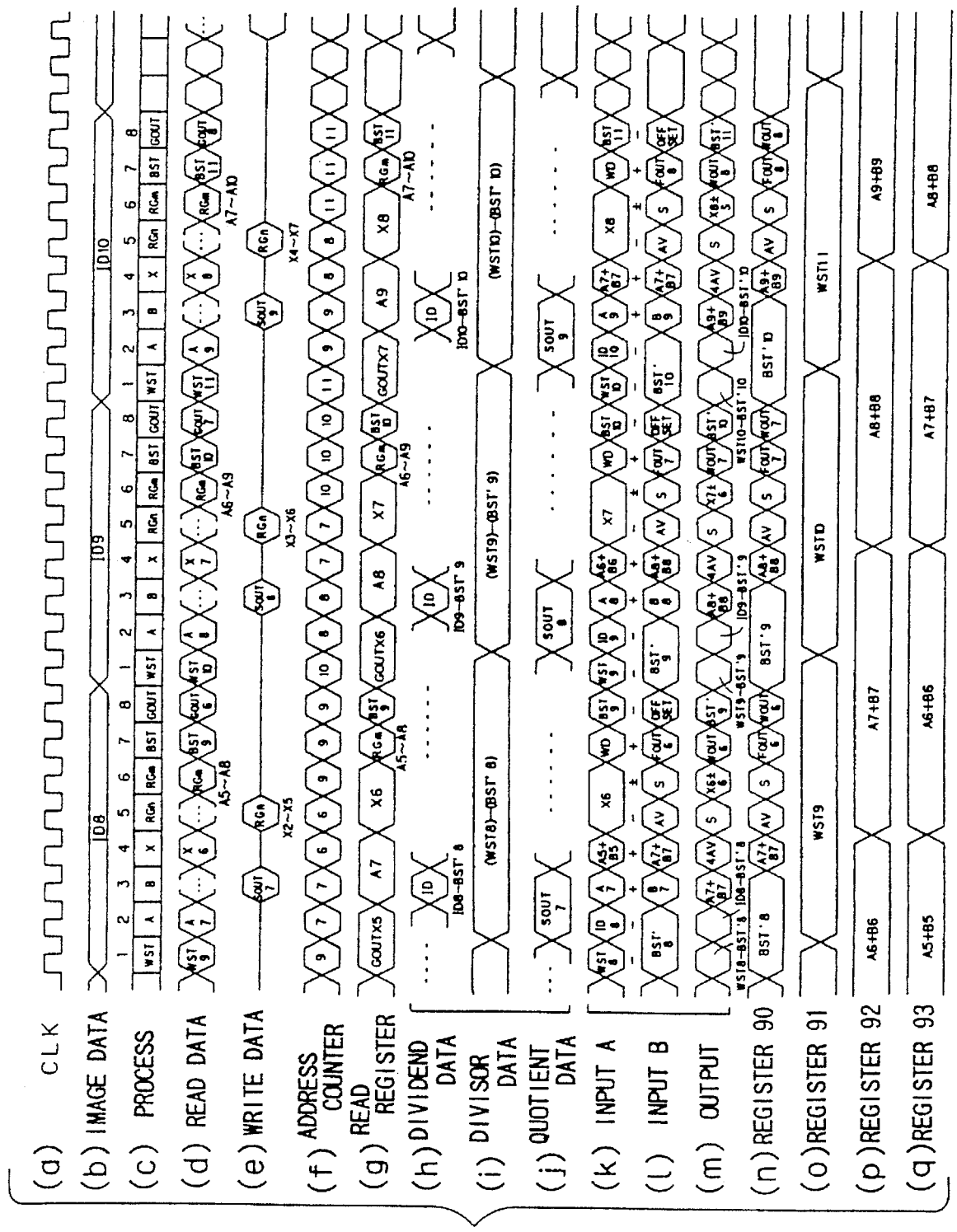
FIG. 20 is a timing chart for explaining an operation related to shading correction processing, filtering processing and density adjustment processing.

FIGS. 20 and 21 are timing charts for explaining the operation. Referring now to FIG. 20, description is made of the shading correction processing, the filtering processing and the density adjustment processing. FIG. 20(*a*) shows a clock signal CLK for defining a processing operation, FIG. 20(*b*) shows image data ID inputted for each pixel from the analog-to-digital converter 17, FIG. 20(*c*) shows the contents of processing, FIG. 20(d) shows read data from the memory 18, FIG. 20(e) shows write data to the memory 18, FIG. 20(f) shows a value generated by the address counter 41 (see FIG. 2) which is contained in the address producing circuit 87, and FIG. 20(g) shows the contents held by the read register 84. In addition, FIG. 20(h) shows dividend data in the divider circuit 86, FIG. 20(i) shows divisor data, and FIG. 20(j) shows quotient data. Furthermore, FIG. 20(k) shows data accepted from the input terminal A of the first adder 81, FIG. 20(l) shows data accepted from the input terminal B of the first adder 81, and FIG. 20(m) shows output data of the first adder 81. Furthermore, FIGS. 20(n), 20(o), 20(p) and 20(q) respectively show the contents held by the registers 90, 91, 92 and 93.

First, an operation related to the memory 18 will be described with reference to the following table 3.

TABLE 3

| cycle number | 1 | 2 | 3 | 4 | 5 | 6 | 7 | 8 |
|---|---|---|---|---|---|---|---|---|
| read/write | read | read | write | read | write | read | read | read |
| contents of processing | WST | A | B | X | RGn | RGm | BST | GOUT |
| address counter | −2 | +0 | −1 | +0 | +3 | +0 | +0 | +1 |

Processing with respect to the respective pixels is terminated in eight cycles from the first cycle to the eighth cycle. In the first cycle (WST), white reference data WST is read out from the memory 18, and the address counter 41 is decremented by two from its value at the present time point.

In the second cycle (A), data after shading correction is read out from the memory 18, and the value of the address counter 41 is not changed. The data after shading correction which is read out in the second cycle (A) is data on a line two lines ahead of the present line which is shown with an initial A in FIG. 5.

In the third cycle (B), data after shading correction is written, and the address counter 41 is decremented by one. The data written at this time is data on the present line which is shown with an initial B in FIG. 5.

In the fourth cycle (X), data after shading correction is read out, and the value of the address counter 41 is not changed, as in the second cycle (A). The data read out in this fourth cycle (X) is data on a line one line ahead of the present line which is shown with an initial X in FIG. 5.

In the fifth cycle (RGn), the accumulated error RGn in the foregoing equation (16) which is produced in the error diffusion processing is written to the memory 18. At this time, the address counter 41 is incremented by three.

In the sixth cycle (RGm), the accumulated error RGm expressed by the foregoing equation (11) which is obtained in the error diffusion processing on the line one line ahead of the present line is read out from the memory 18, and the value of the address counter 41 is not changed.

In the seventh cycle (BST), black reference data BST is read out. At this time, the value of the address counter 41 is not changed.

In the eighth cycle (GOUT), data GOUT after gamma correction which is generated from the gamma correcting table (see FIG. 6) is read, and the address counter 41 is incremented by one.

The image data ID are so, sequentially applied that the order is first image data ID1 corresponding to the first pixel, then ID1, ID2, . . . FIG. 20 shows the image data ID8 corresponding to the eighth pixel and the image data corresponding to the subsequent pixels. In a time period during which the image data ID8 corresponding to the eighth pixel is inputted, black reference data WST9 stored in the memory 18 is first read out to correspond to the ninth pixel indicated by the address counter 41 in the first cycle (WST). This data read out is held in the register 91 on the leading edge of the clock signal CLK.

The address counter 41 is decremented by two so that its indicated value becomes "7". In the second cycle (A), data A7 after shading correction corresponding to the seventh pixel belonging to the line two lines ahead of the present line is read out. This data A7 is held in the read register 84, and is further applied to the one input terminal A of the first adder 81. Data SOUT7 after shading correction corresponding to the seventh pixel belonging to the present line which is outputted from the dividing circuit 86 is applied as data B7 to the other input terminal B of the first adder 81. Conse- quently, the sum (A7+B7) of the data A7 corresponding to the seventh pixel belonging to the line two lines ahead of the present line and the data B7 corresponding to the seventh pixel belonging to the present line is outputted to the output terminal of the first adder 81.

In the second cycle (A), the indicated value of the address counter 41 is held at "7". In the third cycle (B), the data SOUT7 after shading correction corresponding to the seventh pixel is stored in the location where the data A7 has been stored. Specifically, data after shading correction on the present line is written to a memory address from which data after shading correction on a line two lines ahead of the present line has been read out.

The above described operation of (A7+B7) in the first adder 81 is performed in the third cycle (B). This operation corresponds to addition of data corresponding to pixels $A_n$ and $B_n$ in the above described filtering processing. A bit calculation expression for the addition in the third cycle (B) is shown in FIG. 22. Specifically, 7-bit data A and 7-bit data B are added to each other, to obtain 8-bit data (A+B). In FIG. 22, A (0), A (1), . . . , B (0), B (1), . . . , A+B (0), A+B (1), . . . represent data "0" or "1" for each bit.

The value (A7+B7) obtained by the addition in the third cycle (B) corresponding to the image data ID8 is stored in the data register 90 and is applied to the input terminal B of the first adder 81 in the fourth cycle (X). In the fourth cycle (X), data (A5+B5) held in the data register 93 is accepted in the input terminal A of the first adder 81. Specifically, in the fourth cycle (X), data (A7+B7) corresponding to the seventh pixel is held in the data register 90, data (A6+B6) corresponding to the sixth pixel is held in the data register 92, and data (A5+B5) corresponding to the fifth pixel is held in the data register 93. If the data A7 and B7 respectively correspond to the data $A_n$ and $B_n$ shown in FIG. 5, data A5 and B5 respectively correspond to the data $A_{n-2}$ and $B_{n-2}$.

4AV expressed by the following equation (17) which is the result of the addition in the first adder 81 is outputted to the output terminal of the adder 81:

$$4AV=(A7+B7)+(A5+B5) \qquad (17)$$

A bit calculation expression for this addition is shown in FIG. 22. 8-bit data (A+B) corresponding to the data (A7+

B7) and 8-bit data (A+B)' corresponding to the data (A5+B6) are added to each other, to obtain 9-bit data 4 AV which is the result of the addition. This 9-bit data 4 AV corresponds to four times the average value AV of the data A7, B7, A5 and B5 corresponding to four pixels which are to be subjected to addition.

Since in the third cycle (B), the address counter 41 is decremented by one, data X6 after shading correction corresponding to the sixth pixel is read out from the memory 18 in the fourth cycle (X). This data X6 corresponds to the data $X_{n-1}$ when the data A7 and B7 respectively correspond to the data $A_n$ and $B_n$ shown in FIG. 5.

The data X6 read out from the memory 18 is applied to the input terminal A of the first adder 81 from the read register 84 in the fifth cycle (RGn). At this time, data 2X6 which is two times the data X6 is applied to the input terminal A of the first adder 81 by a bit operation described later. In addition, a value 2AV obtained by dividing 4AV which is the output of the first adder 81 in the fourth cycle (X) by two by a bit operation as described later is inputted to the input terminal B of the adder 81. 2AV inputted at this time is inverted and inputted. Consequently, an operation expressed by the following equation (18) is performed in the first adder 81.

$$\begin{aligned} 2X6 - 2AV &= 2X6 - \frac{A7 + B7 + A5 + B6}{2} \\ &= \frac{2}{4} \cdot 4X6 - \frac{2}{4}(A7 + B7 + A5 + B6) \\ &= 2 \times \frac{1}{4}\{(X6 - A5) + (X6 - A7) + (X6 - B5) + (X6 - B5)\} \end{aligned} \quad (18)$$

It is understood that the value expressed by the foregoing equation (18) is merely a differential value S corresponding to the sixth pixel belonging to the line one line ahead of the present line by comparing the equation (18) with the foregoing equation (3).

A bit calculation expression in the fifth cycle (RGn) is as shown in FIG. 22. Specifically, the data 4AV operated in the fourth cycle (X) is inverted (shown with an overline in FIG. 22), and is further shifted lower by one bit, thereby to generate data −2AV. The least significant bit AV (0) of the data 4AV is added to data X corresponding to the data X6 on the side of the least significant bit thereof, thereby to generate data 2X which is two times the data X. The data 2X and the data −2AV are added to each other, to obtain a 9-bit differential value S by the operation expressed by the foregoing equation (18).

Meanwhile, a random number (R1+R2−1) in the foregoing equation (3) is generated by the bit operations with respect to the above described data 4AV and X.

The differential value S thus operated is applied to the input terminal B of the first adder 81 in the subsequent sixth cycle (RGm), to perform an operation of (X6+S). Data is selected so as to adapt to a data processing method shown in the foregoing table 1 depending on the differential value S and the value (X6+S) which is the result of the addition, and the selected data is written to the data register 90 as data after filtering processing FOUT6 in the seventh cycle (BST).

A bit calculation in the sixth cycle (RGm) is performed so as to add the lower seven bits of the data S generated in the fifth cycle and 7-bit data Xn-1, as shown in FIG. 22. Consequently, 8-bit data XS is obtained.

The data FOUT 6 after filtering processing is also applied to the input terminal B of the first adder 81 in the seventh cycle (BST). At this time, density correction data WD corresponding to a pixel position of the data FOUT6 after filtering processing is applied to the input terminal A of the first adder 81.

Therefore, the output of the first adder 81 becomes data WOUT6 expressed by the following equation (19) which is to be subjected to the density adjustment processing as shown in, for example, FIG. 8:

$$WOUT6 = FOUT6 + WD \quad (19)$$

Gamma correction as described later is performed on the basis of this data WOUT6, to obtain data GOUT after gamma correction.

The addition expressed by the foregoing equation (19) for density adjustment is performed in the seventh cycle (BST), and the gamma correction is performed in the eighth cycle (GOUT). Bit calculation expressions in the seventh and eighth cycles are as shown in FIG. 23.

Since in the eighth cycle (GOUT), the value of the address counter 41 is "9", the black reference data BST9 stored to correspond to the ninth pixel is read out from the memory 18. An offset OFFSET is inverted and applied to the input terminal B of the first adder 81 from a register which is not shown in FIG. 19. In the first adder 81, an operation expressed by the following equation is performed:

$$BST'9 = BST9 - OFFSET \quad (20)$$

A bit calculation expression in the first adder 81 in the eighth cycle (GOUT) is shown in FIG. 24. Specifically, a 7-bit offset OFFSET is subtracted from 7-bit data BST corresponding to the black reference data BST9, to obtain 8-bit data BST' corresponding to the data BST'9.

The value BST'9 obtained by the operation is applied to the input terminal B of the first adder 81 in the first cycle (WST) corresponding to the image data ID9 of the ninth pixel and is also held in the data register 90, as shown in FIG. 20. In this first cycle (WST), white reference data WST9 held in the data register 91 is applied to the input terminal A of the first adder 81. In the first adder 81, an operation given by the following expression (21) is performed:

$$WST9 - BST'9 \quad (21)$$

A bit calculation expression in the first cycle (WST) is as shown in FIG. 24. Specifically, 7-bit data BST' corresponding to the data BST'9 is subtracted from 7-bit data WST corresponding to the data WST9, to obtain 8-bit data (W−B'). This data (W−B') corresponds to the value (WST9−BST'9) given by the foregoing expression (21).

In the subsequent second cycle (A), the value given by the foregoing expression (21) is accepted as divisor data in the divider circuit 86, as shown in FIG. 20. In addition, the value BST'9 from the data register 90 is applied to the input terminal B of the first adder 81. On the other hand, the image data ID9 is accepted in the input terminal A of the first adder 81. An operation given by the following expression (22) is performed:

$$ID9 - BST'9 \quad (22)$$

A bit calculation expression for this operation is as shown in FIG. 24. Specifically, 7-bit data BST' corresponding to the data BST'9 is subtracted from 7-bit data ID corresponding to the image data ID9, to obtain 8-bit data (I−B'). This data (1−B') corresponds to data (ID9−BST'9) given by the foregoing expression (22).

In the subsequent third cycle (B), the value given by the foregoing expression (22) is accepted as dividend data in the divider circuit 86, as shown in FIG. 20. In a time period during which seven clocks CLK are inputted, division expressed by the following equation (23) is carried out. The result of the division is data SOUT9 after shading correction corresponding to the ninth pixel.

$$SOUT9 = \frac{ID9 - BST9}{WST9 - BST9} \times K \qquad (23)$$
$$= \frac{ID9 - (BST9 - OFFSET)}{WST9 - (BST9 - OFFSET)} \times K$$
$$= \frac{ID9 - BST9 + OFFSET}{WST9 - BST9 + OFFSET} \times K$$

It is clear from the comparison with the foregoing equation (1) that the value given by the equation (23) is a value subjected to shading correction.

Meanwhile, the data SOUT9 after shading correction is written to the memory 18 in the third cycle (B) corresponding to image data ID10 of the tenth pixel. The location to which the data is written at this time is the location from which the data A9 after shading correction on the line two lines ahead of the present line which has been read out for filtering processing immediately before the writing has been read out.

A bit calculation expression for the division expressed by the foregoing equation (23) is as shown in FIG. 24. Specifically, the lower seven bits of the data (I–B') obtained in the second cycle are taken out and one bit is added to the lower seven bits on the side of the least significant bit thereof, to generate data of a total of eight bits. The lower seven bits of the data (W–B') obtained in the first cycle is subtracted from the 8-bit data (I–B'). As a result of the subtraction, 8-bit data DIV is obtained in the first to eight bit positions, and data SOUT (k) which is "1" or "0" (where $0 \leq k \leq 7$) depending on whether the subtraction is possible is obtained in the ninth bit position.

When the subtraction is possible, the divisor data (W–B') is subtracted from data obtained by shifting the result of the subtraction higher by one bit. On the other hand, when the subtraction is impossible, data obtained by shifting the data (I–B') which is an object of subtraction higher by one bit is used as an object of subtraction again.

Such an operation is repeated seven times, and data SOUT (k) obtained in the respective subtractions are accumulated, to obtain 7-bit data SOUT. This data SOUT corresponds to the data SOUT9 given by the foregoing equation (23), to be data after shading correction.

Referring now to a timing chart of FIG. 21, gamma correction processing and error diffusion processing are described. The contents shown in FIGS. 21(a) to 21(g) are the same as those shown in FIGS. 20(a) to 20(g). FIG. 21(r) shows data applied to the input terminal A of the second adder 82, FIG. 21(s) shows data applied to the input terminal B of the second adder 82, and FIG. 21(t) shows data representing the result of the operation outputted to the output terminal of the second adder 82. In addition, FIGS. 21(u), 21(v), 21(w), 21(x), 21(y) and 21(z) respectively show data held in the registers 94, 95, 96, 97, 98 and 99.

If data WOUT7 after density adjustment (see FIG. 20) is outputted from the first adder 81 in the seventh cycle (BST) corresponding to the image data ID9 of the ninth pixel, the address producing section 87 generates an address in the gamma correcting table. The data WOUT after density adjustment constitutes a part of the address in the gamma correcting table, as described above.

Consequently, in the eighth cycle (GOUT), data GOUT7 after gamma correction is read out from the memory 18, to achieve gamma correction (see FIG. 23).

The data GOUT7 after gamma correction is inputted to the input terminal A of the second adder 82 from the read register 84 as data GOUT (X7) corresponding to a target pixel in error diffusion processing in the first cycle (WST) corresponding to the image data ID10 of the tenth pixel. At this time, an accumulated error RG is applied to the input terminal B of the second adder 82 from the output terminal thereof.

This accumulated error RG corresponds to the accumulated error RG (m) expressed by the foregoing equation (11). Specifically, when a pixel corresponding to the data GOUT (X7) is the target pixel A shown in FIG. 18, the accumulated error RG is a value obtained by adding error diffusion coefficients times the respective errors HG produced in the pixels G, F, E, D, C and B in the vicinity of the target pixel A. If the image data ID inputted is data on the present line, the data GOUT (X7) corresponds to the seventh pixel belonging to a line one line ahead of the present line.

More specifically, a value obtained by adding error diffusion coefficients times binary-coded errors HG respectively produced with respect to data A6 corresponding to the sixth pixel, data A7 corresponding to the seventh pixel, data A8 corresponding to the eighth pixel and data A9 corresponding to the ninth pixel which belong to a line two line ahead of the present line, and data X5 corresponding to the fifth pixel and data X6 corresponding to the sixth pixel which belong to a line one line ahead of the present line, is an accumulated error RG inputted in the first cycle (WST). RAND is a random number. This random number RAND will be described later.

As a result of the foregoing, in the first cycle (WST) and the second cycle (A), data T (X7) expressed by the following equation (24) is outputted to the output terminal of the second adder 82:

$$T(X7) = GOUT(X7) + RG \qquad (24)$$

In such a manner, the above described [processing 3] in error diffusion processing is performed. Specifically, the above described data T (X7) corresponds to the data T (A) expressed by the foregoing equation (13) which is to be subjected to binary-coding judgment.

A bit calculation expression for this addition is shown in FIG. 25. Specifically, in the first cycle (WST) and the second cycle (A), 6-bit data GOUT and 8-bit data RG are added to each other, to obtain 8-bit data T.

In the third cycle (B), the above described data T (X7) is applied to the binary-coding judging circuit 88 to perform binary-coding judgment processing, so that binary data BIN (X7) is held in the register 99. On the other hand, in the binary-coding judging circuit 88, a binary-coded error HG (X7) corresponding to the data T (X7) is produced on the basis of the comparison between a binary-coding threshold value and the data T (X7), as shown in FIG. 25.

This generated binary-coded error HG (X7) is applied to the input terminal A of the second adder 82, as shown in FIG. 21. At this time, data RG (X4+X5) held in the register 96 is applied to the input terminal B of the second adder 82. When a pixel corresponding to the data X7 is the pixel A shown in FIG. 18, this data RG (X4+X5) corresponds to a value obtained by adding error diffusion coefficients times the binary-coded errors produced with respect to data X4 and the data X5 respectively corresponding to the pixels X and C shown in FIG. 18.

Specifically, if binary-coded errors in the pixels corresponding to the data X4 and X5 are respectively taken as HG (X4) and HG (X5), the data RG (X4+X5) is expressed by the following equation:

$$RG(X4+X5) = \frac{1}{4}HG(X4) + \frac{1}{8}HG(X5) \qquad (25)$$

A value RG (X4+X5+X7) obtained by adding the above described accumulated error RG (X4+X5) to an error diffusion coefficient ⅛ times the binary-coded error HG (X7) is outputted to the output terminal of the second adder 82.

A bit calculation expression in the third cycle (B) is shown in FIG. 26. Specifically, the 8-bit binary-coded error HG (X7) generated in the second cycle (A) is shifted lower by only three bits to be a value which is one-eighth its original value and then, the value is added to 8-bit accumulated error RG (X4+X5). Consequently, an accumulated error RG (X4+X5+X7) expressed by the following equation (26) is obtained. In such a manner, the above described [processing 5] is performed.

$$RG(X4+X5+X7) = \frac{1}{8}HG(X7) + RG(X4+X5) \qquad (26)$$
$$= \frac{1}{8}HG(X7) + \frac{1}{4}HG(X4) + \frac{1}{8}HG(X5)$$

The accumulated error RG (X4+X5+X7) operated is then applied to the input terminal B of the second adder 82 in the fourth cycle (X). At this time, the binary-coded error HG (X6) in the sixth pixel belonging to the line one line ahead of the present line is applied to the input terminal A of the second adder 82 from the register 98.

In the fourth cycle (X) and the fifth cycle (RGn), the binary-coded error HG (X6) is shifted lower by only three bits to be a value which is one-eighth its original value, and the value is added to the accumulated error RG (X4+X5+X7), as can be seen from a bit calculation expression shown in FIG. 26. Consequently, an accumulated error RG (X4 to X7) expressed by the following equation (27) is obtained. Consequently, the above described [processing 6] in error diffusion processing is performed.

$$RG(X4\ to\ X7) = \frac{1}{8}HG(X6) + RG(X4+X5+X7) \qquad (27)$$
$$= \frac{1}{4}HG(X4) + \frac{1}{8}HG(X5) +$$
$$\frac{1}{8}HG(X7) + \frac{1}{8}HG(X7)$$

This accumulated error RG (X4 to X7) operated is written to the register 94 and is written to the memory 18, which is used when error diffusion processing is performed with respect to a pixel belonging to the present line.

In the sixth cycle (RGm), the binary-coded error HG (X7) corresponding to the data X7 held in the register 97 is applied to the input terminal A of the second adder 82. The binary-coded error HG (X6) corresponding to the data X6 held in the register 98 is applied to the input terminal B of the second adder 82. An accumulated error RG (X6+X7) expressed by the following equation (28) is operated by a bit calculation shown in FIG. 25. Consequently, the above described [processing 1] is performed.

$$RG(X6+X7) = \frac{1}{4}HG(X7) + \frac{1}{8}HG(X6) \qquad (28)$$

The accumulated error RG (X6+X7) obtained is applied to the input terminal B of the second adder 82 in the subsequent seventh cycle (BST), as shown in FIG. 21. At this time, an accumulated error RG (A7 to A10) found when error diffusion processing is performed utilizing a line corresponding to the image data ID currently inputted as the present line with respect to a pixel corresponding to the line two lines ahead of the present line is applied to the input terminal A of the second adder 82. This accumulated error RG (A7 to A10) is read out as data RGm from the memory 18 in the sixth cycle (RGm), and is applied to the input terminal A of the second adder 82 from the read register 84 in the seventh cycle (BST).

The accumulated error RG (A7 to A10) is data corresponding to the data X8 which is to be subsequently subjected to error diffusion processing. Specifically, if the data X8 corresponding to the eighth pixel belonging to the line one ahead of the present line corresponds to the pixel A shown in FIG. 18, a value obtained by accumulating binary-coded errors in data A7 to A10 corresponding to the seventh pixel to the tenth pixel belonging to the line two lines ahead of the present line which correspond to the pixels G, F, E and D is an accumulated error RG (A7 to A10). Specifically, if the binary-coded errors corresponding to the data A7 to A10 are respectively taken as HG (A7), HG (A8), HG (A9) and HG (A10), the accumulated error RG (A7 to A10) is expressed by the following equation (29):

$$RG(A7\ to\ A10) = \frac{1}{8}HG(A7) + \frac{1}{4}HG(A8) + \qquad (29)$$
$$\frac{1}{8}HG(A9) + \frac{1}{8}HG(A10)$$

Consequently, in the seventh cycle (BST), an accumulated error RG (A7 to A10+X6+X7) expressed by the following equation (30) is operated in the second adder 82, so that the above described [processing 2] is performed:

$$RG(A7\ to\ A10+X6+X7) = RG(A7\ to\ A10) + RG(X6+X7) \qquad (30)$$

A bit calculation expression for this operation is as shown in FIG. 25. Specifically, a 8-bit accumulated error RG (X6+X7) which is the result of the operation in the sixth cycle (RGm) and a 7-bit accumulated error RGm (=RG (A7 to A10)) read from the memory 18 are added to each other.

The result of the addition in the seventh cycle (BST) is applied to the input terminal B of the second adder 82 again in the eighth cycle (GOUT). At this time, a random number RAND is inputted to the input terminal A of the second adder 82. As a result, an accumulated error RG (A7 to A10+X6+X7+RAND) is outputted to the output terminal of the second adder 82.

The addition of the random number RAND has the following significance. Specifically, it has been known by experience that if error diffusion processing is performed in a case where density data in an image portion having a relatively large area has a particular predetermined value corresponding to an intermediate density, an image after the processing is significantly degraded. The degradation of the image can be eliminated by the above described addition of the random number.

The accumulated error RG (A7 to A10+X6+X7+RAND) operated by the second adder 82 is applied to the register 94, and is applied to the input terminal B of the second adder 82 in the first cycle (WST) corresponding to image data ID11 of the subsequent eleventh pixel.

Thereafter, the same error diffusion processing as that performed with respect to the data X7 in a time period during which the image data ID9 corresponding to the ninth pixel is inputted, is performed with respect to the data X8 corresponding to the eighth pixel belonging to the line one line ahead of the present line.

As described in the foregoing, in the construction shown in FIG. 19, the shading correction processing, the filtering processing and the density adjustment processing are attained mainly by the first adder 81, the dividing circuit 86, the registers 90, 92 and 93, the address producing circuit 87, and the gamma correction and the error diffusion processing are attained mainly by the second adder 82, the binary-coding judging circuit 88, and the registers 95 to 98.

Description is now made of an isolated point removal processing performed in the isolated point removal processing section 39 (see FIG. 2) with respect to a binary image.

Figure 27:
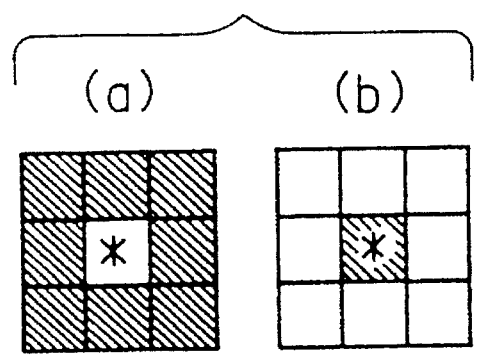
FIG. 27 are diagrams for explaining isolated point removal processing.
Figure 28:
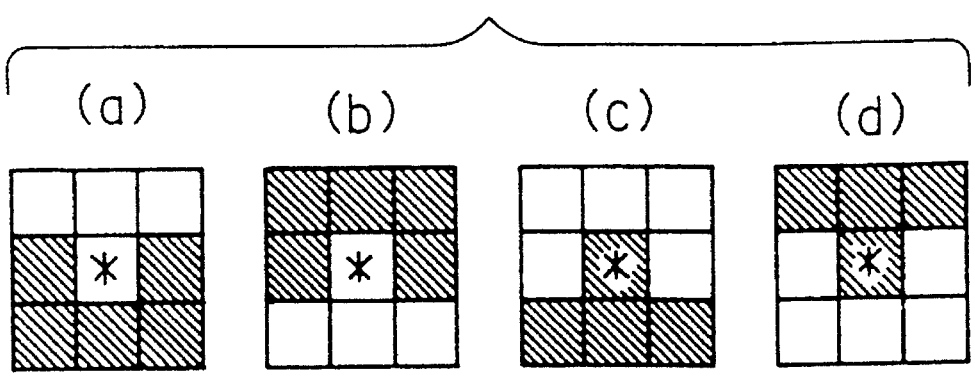
FIG. 28 are diagrams for explaining isolated point removal processing.
Figure 29:
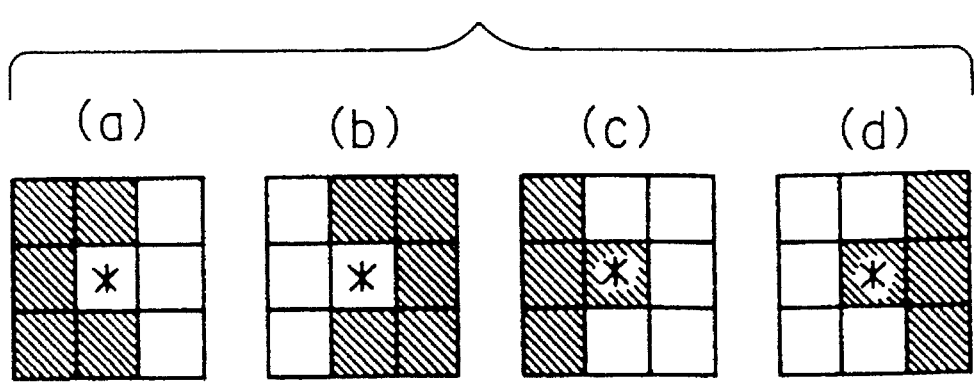
FIG. 29 are diagrams for explaining isolated point removal processing.

FIGS. 27(a), 27(b), 28(a to d) and 29(a to d) are diagrams for explaining isolated point removal processing. The isolated point removal processing is processing for converting, when the value of a target pixel which is indicated by a mark "*" is different from the value of any one of the pixels in predetermined positions surrounding the target pixel in a binary image processed by the simple binary-coding processing section 36, the value of the target pixel into the value of the pixels around the target pixel.

More specifically, if the target pixel is a white pixel and eight pixels around the target pixel are black pixels as shown in FIG. 27(a), the target pixel is an isolated white pixel. Therefore, this isolated white pixel is converted into a black pixel. On the other hand, FIG. 27(b) shows a case where the target pixel is an isolated black pixel. At this time, the target pixel is converted into a white pixel.

Furthermore, FIGS. 28(a) to 28(d) and 29(a) to 29(d) show cases where pixels having different values from the value of the target pixel surround the target pixel in a "U" shape. Also in this case, the value of the target pixel is converted. Specifically, the value of the target pixel is converted into a black pixel in the cases shown in FIGS. 28(a) and 28(b) and FIGS. 29(a) and 29(b), and the value of the target pixel is converted into a white pixel in the cases shown in FIGS. 28(c) and 28(d) and FIGS. 29(c) and 29(d).

By such isolated point removal processing, noise components remaining in a binary image, the effect of jitter caused by the non-uniformity in conveyance of a document, and the like are removed, thereby making it possible to reproduce a good binary image. Moreover, a removed isolated point makes improved data compression efficiency possible. Therefore, the number of transmission codes generated by coding processing such as MH, MR and MRR is reduced, thereby making it possible to reduce time required for facsimile communication.

Figure 30:
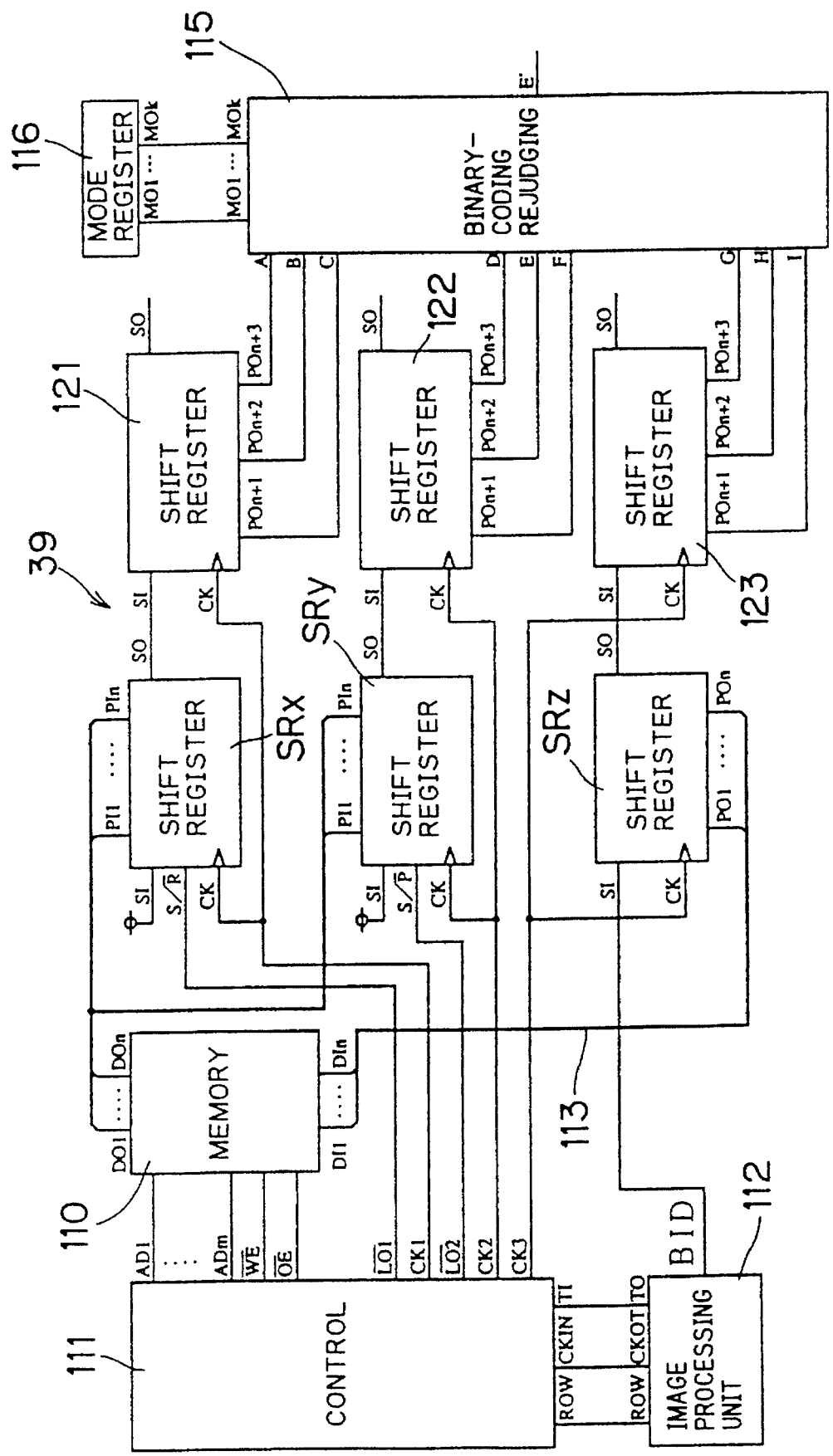
FIG. 30 is a block diagram showing the construction related to isolated point removal processing.

FIG. 30 is a block diagram showing the construction related to the isolated point removal processing section 39. A line memory 110 constituted by storage areas in a part of the memory 18 (see FIG. 6) has a storage capacity capable of storing respective binary data corresponding to pixels belonging to two lines. A control circuit 111 is connected to the line memory 110. Address signals AD1 to ADm of m bits (eight bits in the present embodiment) are applied from the control circuit 111 to the line memory 110. The control circuit 111 also applies a write enable signal WE and an output enable signal OE to the line memory 110. An overline attached to a sign representing a signal shall indicate that the signal is a signal having a negative logic, and the description of the overline is omitted in the specification.

An image processing unit 112 comprising components taking charge of respective processing from shading correction processing to simple binary-coding processing before isolated point removal processing is connected to the control circuit 111. This image processing section 112 outputs binary data BID binary-coded for each pixel in series bit by bit.

This binary data BID is applied to a serial input terminal SI of a shift register SRz of n bits (two bits in the present embodiment). This shift register SRz accepts the binary data BID bit by bit on the basis of a clock signal CK3 applied from the control circuit 111. Parallel output terminals PO1 to POn of the shift register SRz are connected to input terminals DI1 to DIn of the line memory 110 through a line 113.

On the other hand, output terminals DO1 to DOn of the line memory 110 are connected to parallel input terminals PI1 to PIn of each of n-bit shift registers SRz and SRy. The shift registers SRx and SRy are respectively provided with control signal input terminals S/P to which a trigger signal for latching n-bit data from the line memory 110 in parallel is inputted, and control signals LO1 and LO2 from the control circuit 111 are respectively applied to the control signal input terminals S/P. Data from the input terminals PI1 to PIn are latched on the trailing edge of each of the control signals LO1 and LO2.

Clock signals CK1 and CK2 for data shifting are respectively inputted to the shift registers STx and SRy from the control circuit 111. If the clock signal CK1 is applied, data is shifted by one bit in the shift register SRx, so that data are outputted bit by bit from a serial output terminal SO. The same is true for the shift register SRy.

Respective serial output signals of the shift registers SRx, SRy and SRz are applied to respective serial input terminals SI of 3-bit shift registers 121, 122 and 123, and are accepted on the basis of the clock signals CK1, CK2 and CK3, respectively.

3-bit data respectively accepted in the shift registers 121, 122 and 123 are applied to input terminals A, B, C, ... , I of a binary-coding rejudging circuit 115 from respective parallel output terminals POn+1, POn+2 and POn+3 of the shift registers 121, 122 and 123. This binary-coding rejudging circuit 115 performs the above described isolated point removal processing shown in FIG. 27, 28 and 30 utilizing a pixel corresponding to the data applied to the input terminal E as a target pixel, to output data E' after the processing.

A mode register 116 is connected to the binary-coding rejudging circuit 115. Data MO1 to MOk of k bits (two bits in the present embodiment) for selecting a mode for isolated point removal processing are applied from the CPU 14 (see FIG. 1) to the mode register 116. In the present embodiment, three types of modes can be selected. The value of the target pixel is converted if the condition shown in FIG. 27 holds in the first mode, is converted if the condition shown in FIG. 27 or 28 holds in the second mode, and is converted if the condition shown in FIG. 27, 28 or 29 holds in the third mode.

Figure 31:
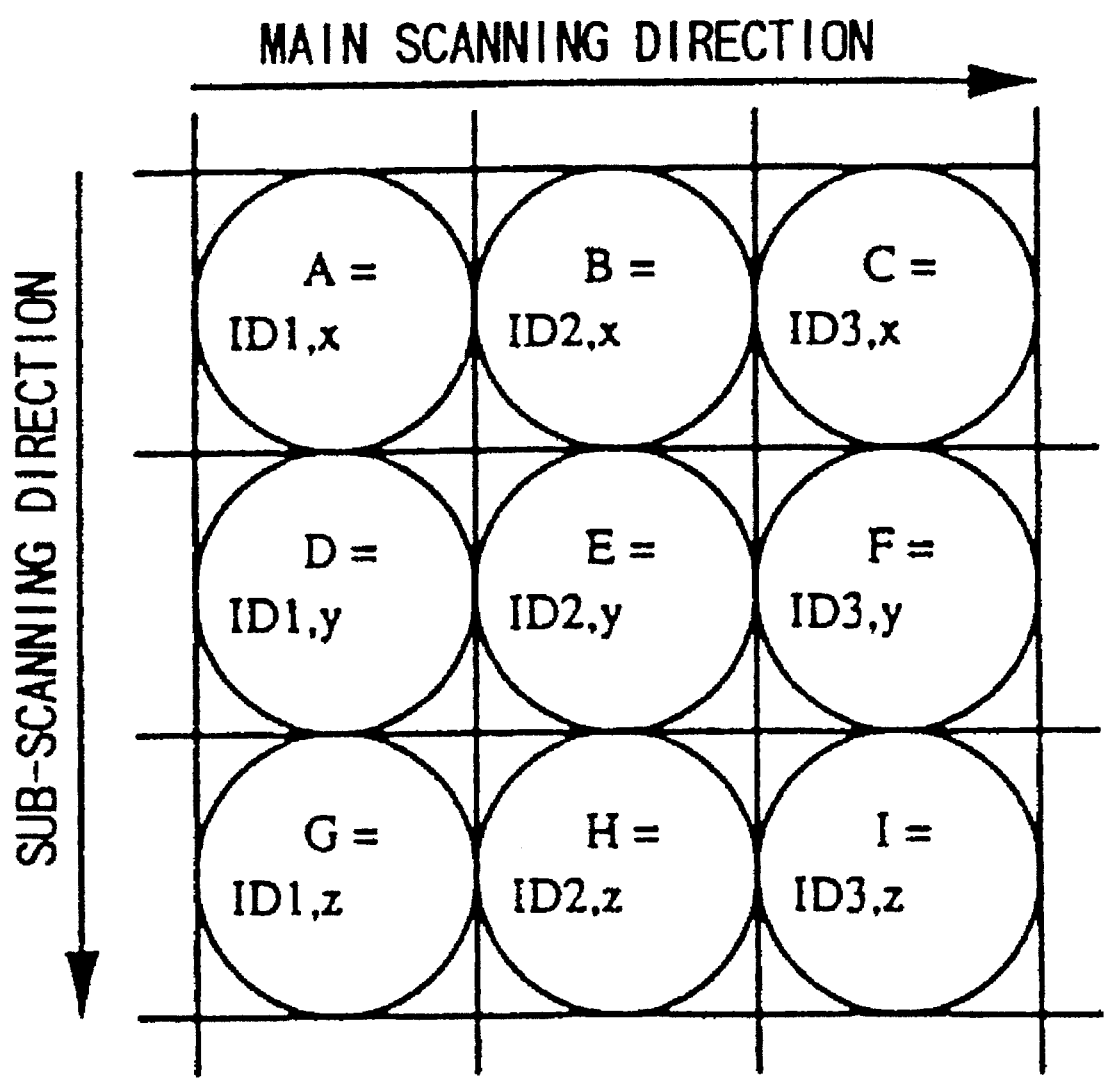
FIG. 31 is a diagram for explaining the positional relationship among pixels corresponding to data used for isolated point removal processing.

FIG. 31 is a diagram for explaining the relationship among data inputted to the binary-coding rejudging circuit 115. Data ID1z, ID2z and ID3z corresponding to three pixels belonging to the present line which have been subjected to processing in the image processing unit 112 are outputted from the shift register 123. In addition, data corresponding to a line one line ahead of the present line are applied to the shift register 122 from the shift register SRy, and data ID1y, ID2y and ID3y corresponding to three pixels out of the data are outputted from the shift register 122. Furthermore, data corresponding to a line two lines ahead of the present line are applied to the shift register 121 from the shift register SRx, and data ID1x, ID2x and ID3x corresponding to three pixels out of the data are outputted from the shift register 121.

As a result, binary data corresponding to respective pixels constituting a matrix with 3×3 pixels as shown in FIG. 31 are inputted in parallel to the binary-coding rejudging circuit 115. At this time, the data ID2x applied to the input terminal E is utilized as data corresponding to the target pixel to perform processing. Since the data are processed in the order read by the image sensor 15 (see FIG. 1), a pixel corresponding to data first inputted to the shift registers 121, 123 and 124 is a pixel close to the head end position of each line.

Figure 32:
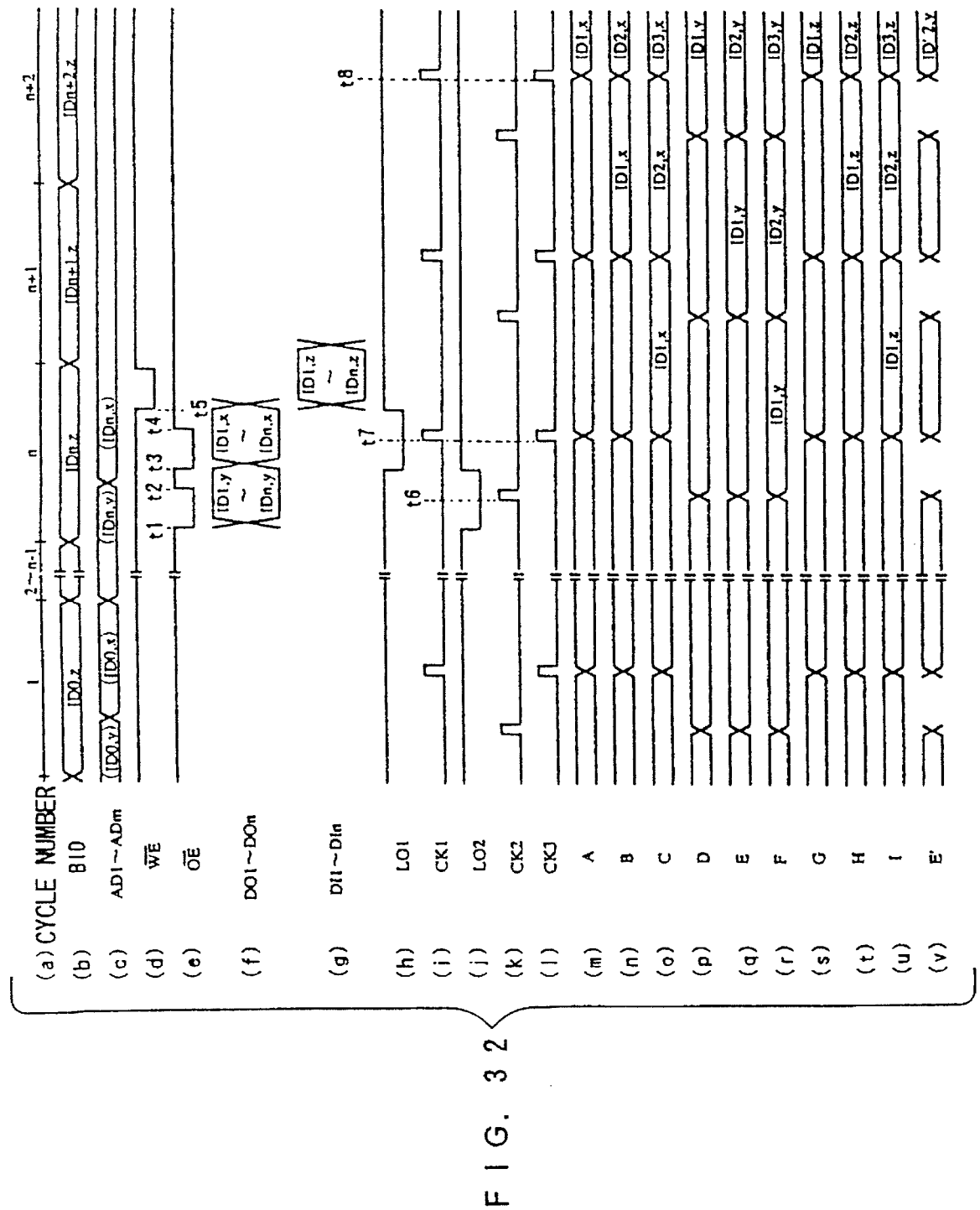
FIG. 32 is a timing chart for explaining an operation.

FIG. 32 is a timing chart for explaining an operation. FIG. 32(a) shows a cycle number, FIG. 32(b) shows binary data BID corresponding to the present line which is inputted to the shift register SRz, FIG. 32(c) shows address signals AD1 to ADm, FIG. 32(d) shows low active write enable signal WE, FIG. 32(e) shows a low active output enable signal OE, FIG. 32(f) shows data outputted to the output terminals DO1 to DOn of the line memory 110, and FIG. 32(g) shows data written to the line memory 110 from the input terminals DI1 to DIn of the line memory 110. In addition, FIGS. 32(h) and 32(j) respectively show the control signals LO1 and LO2 applied to the shift registers SRx and SRy. Data are respectively written in parallel to the shift registers SRx and SRy on the trailing edges of the signals LO1 and LO2. In addition, FIGS. 32(i), 32(k) and 32 (l) respectively show clock signals CK1, CK2 and CK3, and FIG. 32(m) to 32(v) respectively show data inputted to the binary-coding rejudging circuit 115.

Binary data ID1z, ID2x, ID3z, ..., ID(n−1)z corresponding to respective pixels constituting the present line are sequentially inputted to the shift register SRz in a time period from the second cycle to the (n−1)-th cycle. If the data IDnz is inputted to the shift register SRz in the n-th cycle, the output enable signal OE attains a low level at the time t1. At this time, the values of the addresses AD1 to ADm are values (IDny) corresponding to n-bit data ID1y to IDny belonging to a line one line ahead of the present line. Accordingly, the n-bit data ID1y to IDny are outputted to the output terminals DO1 to DOn. The data are latched in parallel to the shift register SRy in synchronization with the trailing edge of the control signal LO2.

If the output enable signal OE rises at the time t2, the addresses AD1 to ADm are switched to values (IDnx) corresponding to n-bit data ID1x to IDnx belonging to a line two lines ahead of the present line. At the time t3 after the addresses are switched, the output enable signal OE attains a low level again. Consequently, the n-bit data ID1x to IDnx corresponding to the line two lines ahead of the present line are outputted to the output terminals DO1 to DOn. The data are written to the shift register SRy in synchronization with the trailing edge of the control signal LO1.

If the output enable signal OE rises at the time t4, the write enable signal WE falls at the time t5 with the addresses being kept invariable at this time. Consequently, n-bit data ID1z to IDnz corresponding to the present line which are held in the shift register SRz are stored in addresses (IDnx) at which the data ID1 to IDnx corresponding to the line two lines ahead of the present line have been stored. Specifically, if the data corresponding to the line two lines ahead of the present line are read out for isolated point removal processing, the data corresponding to the present line are written to the locations from which the data has been read out. As a result of the foregoing, the isolated point removal processing which is processing with respect to pixels belonging to the three lines can be realized by the line memory 110 having a capacity corresponding to two lines.

On the other hand, the first data ID1y out of the data written to the shift register SRy is written to the first stage of the shift register 122 by the clock signal CK2 applied at the time t6. Similarly, the respective first data ID1x and ID1z out of the data written to the shift registers SRx and SRz are written to the first stages of the shift registers 121 and 123 by the clock signals CK1 and CK3 applied at the time t7.

Thereafter, the data are shifted in the shift registers 121, 122 and 123 by the clock signals CK1, CK2 and CK3. As a result, the data corresponding to the nine pixels constituting the matrix shown in FIG. 31 are inputted in parallel to the input terminals A to I of the binary-coding rejudging circuit 115 in a time period from the time t8.

Data ID'2 representing the result of the judgment by the binary-coding rejudging circuit 115 is outputted from the output terminal E'.

Figure 33:
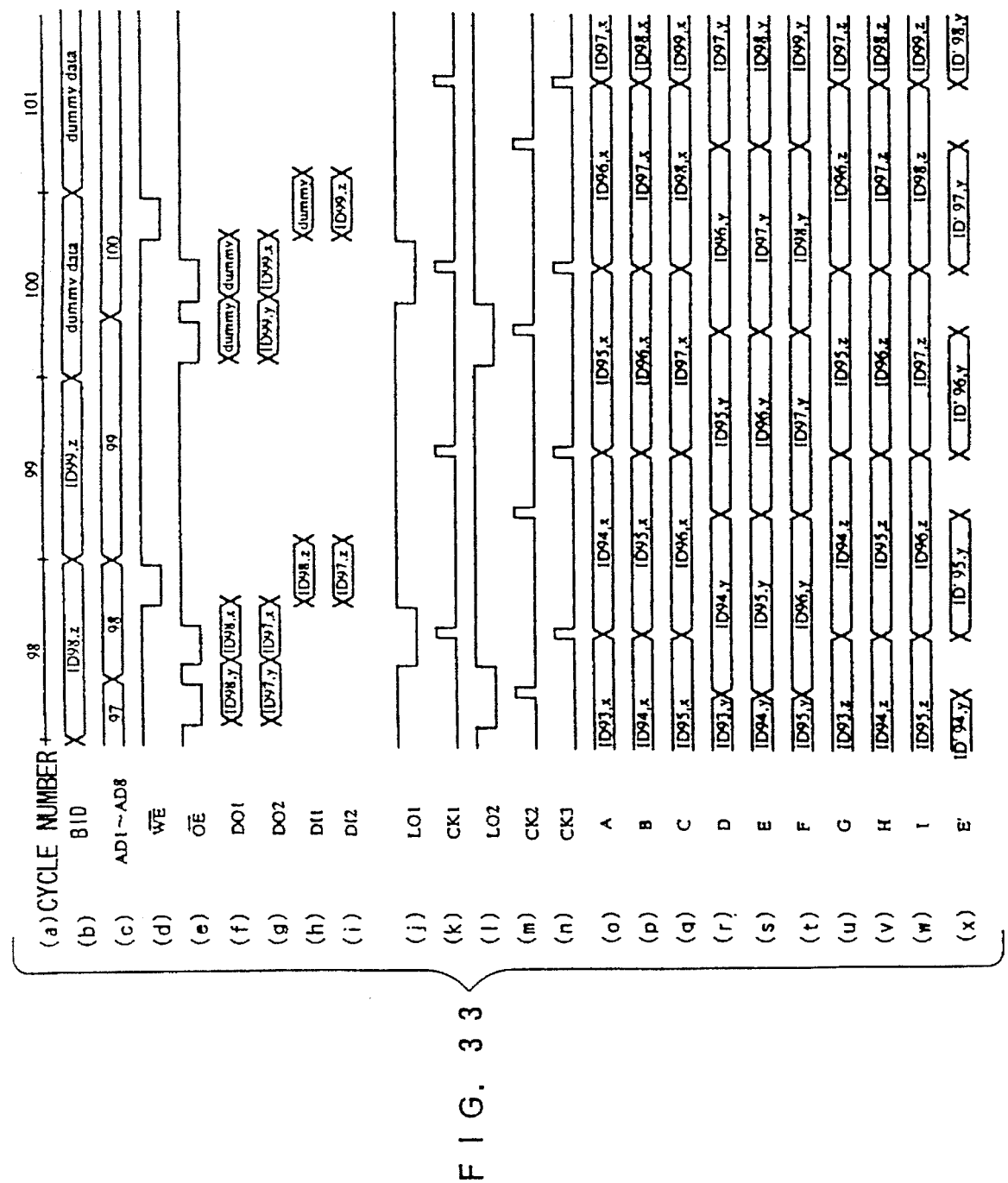
FIG. 33 is a timing chart for explaining an operation in the final stage of processing with respect to one line.

FIG. 33 is a timing chart for explaining the final operation of isolated point removal processing with respect to pixels belonging to one line. Signals or data shown in FIGS. 33(a) to 33(x) are the same as those shown in FIG. 32. In this example, a case is assumed where one line is constituted by 99 pixels. In addition, for simplicity of illustration, n is taken as 2 and M is taken as 8.

The image processing unit 112 outputs binary data ID99z corresponding to the last pixel belonging to the present line and then, immediately outputs not data corresponding to the succeeding line but dummy data. This dummy data is data corresponding to, for example, a white pixel.

The dummy data is outputted when the number of pixels constituting one line is different from an integral multiple of the number of pixels read out/written by one access to the line memory 110. Specifically, the image processing unit 112 outputs the dummy data from the time when binary data ID99x corresponding to the last pixel belonging to one line is written to the shift register SRx to the time when data corresponding to n pixels (two pixels in the example shown in FIG. 33) which are not written in the line memory 110 are accumulated in the shift register SRx.

Meanwhile, there arises a problem when continuous addresses are alternately assigned to the respective lines in the line memory 110 capable of storing data corresponding to two lines. For example, a case is assumed where data corresponding to a line one line ahead of the present line are stored in odd addresses ..., "95", "97", "99", ..., and data corresponding to a line two lines ahead of the present line are stored in even addresses ..., "96", "98", ... At this time, data corresponding to the lines one line and two lines ahead of the present line can be alternately read out by generating continuous addresses.

On the other hand, data corresponding to the present line are written to addresses from which data corresponding to the line two lines ahead of the present line have been read out in the line memory 110, as described above. Specifically, in the above described case, the data corresponding to the present line are written to the even addresses, ..., "96", "98", ... As a result, when data corresponding to a line succeeding the present line are applied from the image processing unit 112, data corresponding to a line one line ahead of the succeeding line are stored in the even addresses, ..., "96", "98", ..., and data corresponding to a line two lines ahead of the succeeding line are stored in the odd addresses, ..., "95", "97", "99", ... Specifically, the correspondence between the odd and even addresses and data differs for each processing with respect to one line.

Figure 34:
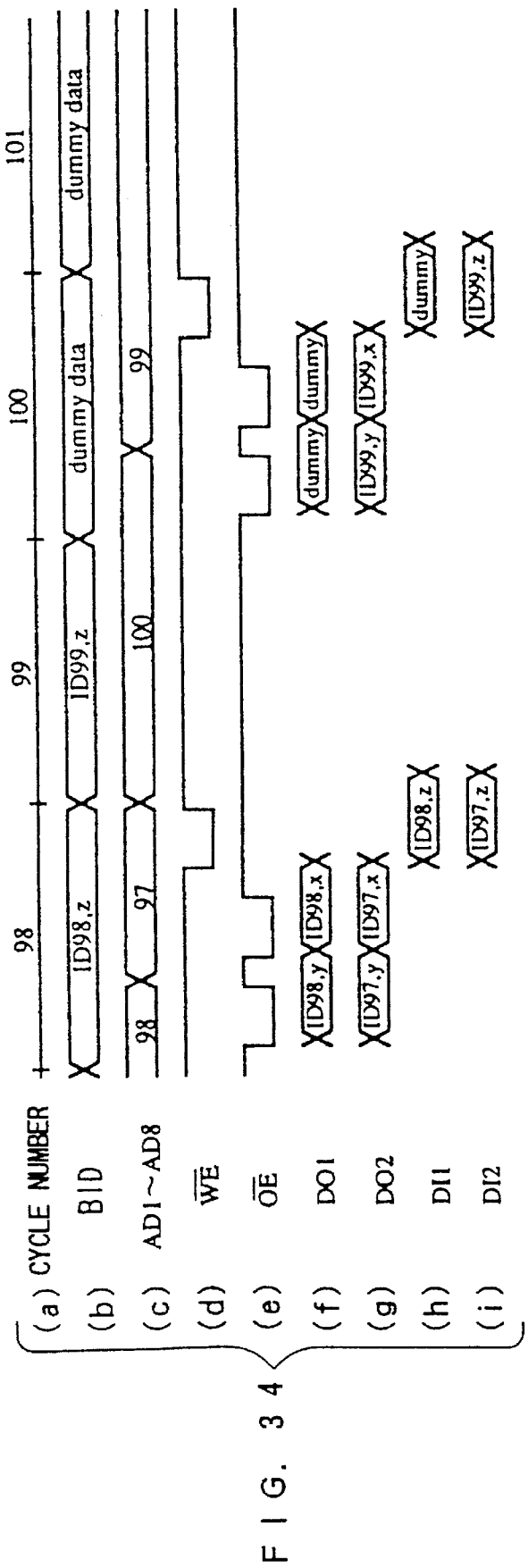
FIG. 34 is a timing chart for explaining an operation in the final stage of processing with respect to one line.

In the present embodiment, therefore, generated addresses are made different for each line. Specifically, continuous addresses as shown in FIG. 33(c) are generated with respect to a given line, and addresses as shown in FIG. 34(c) are generated with respect to the succeeding line. Specifically, the even addresses and the odd addresses are exchanged so that addresses at which data are written inevitably become addresses at which data corresponding to a line two lines ahead of the present line have been stored.

Figure 35:
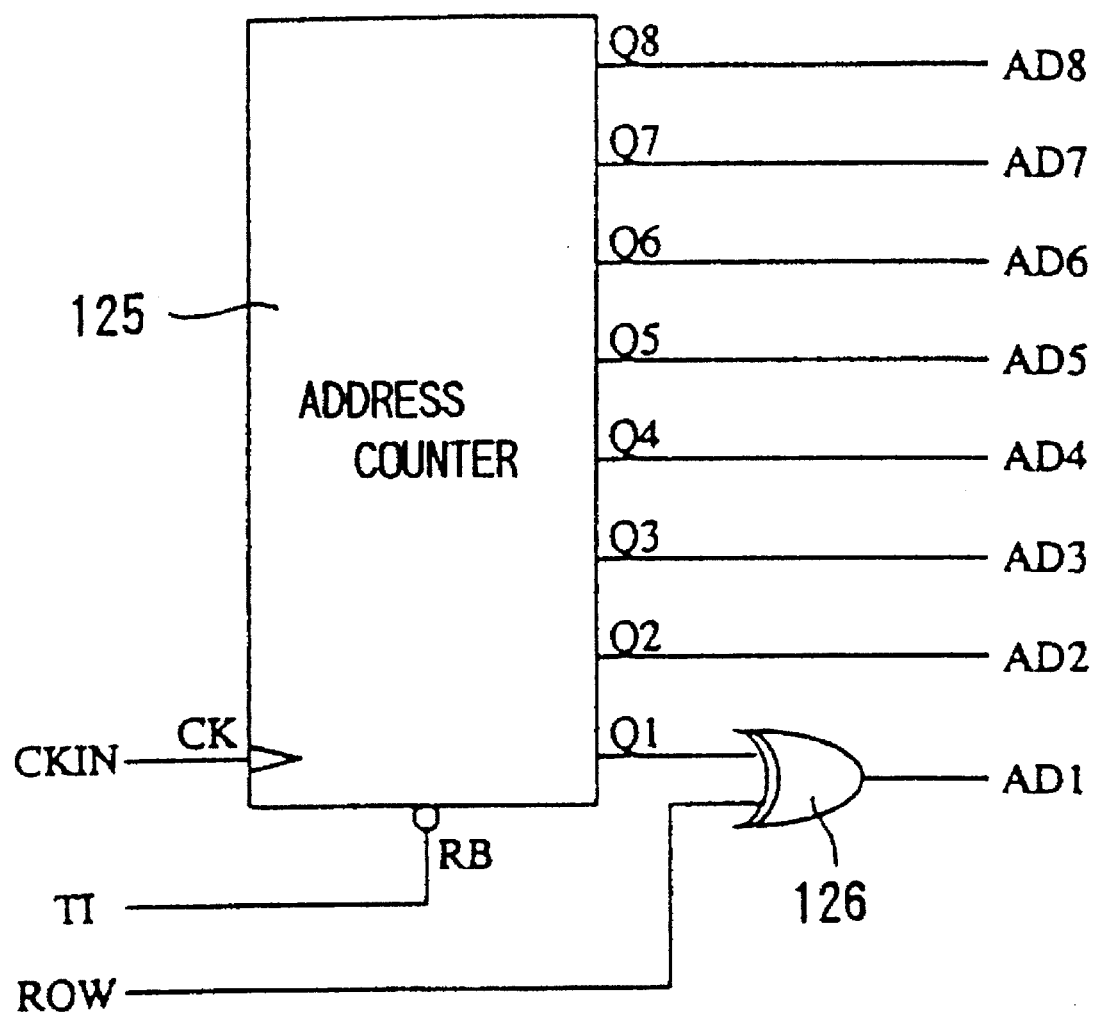
FIG. 35 is a block diagram showing the construction for generating addresses applied to a line memory.

The construction provided in the control circuit 111 for generating such addresses is shown in FIG. 35. Specifically, an output of an output terminal Q1 corresponding to the least significant bit of an address counter 125 for generating continuous 8-bit addresses AD1 to AD8 on the basis of a clock signal CKIN becomes the least significant bit AD1 out of the addresses AD1 to AD8 through an exclusive OR-gate 126. A signal ROW which is toggled between "0" and "1" for each line is applied from the image processing unit 112 to the exclusive OR gate 126. A signal of the output terminal Q1 directly becomes the least significant bit AD1 if the signal ROW is "0", being inverted to be the least significant bit AD1 if the signal ROW is "1". Consequently, the continuous addresses shown in FIG. 33(c) and the discontinuous addresses shown in FIG. 34(c) are alternately generated.

Figure 36:
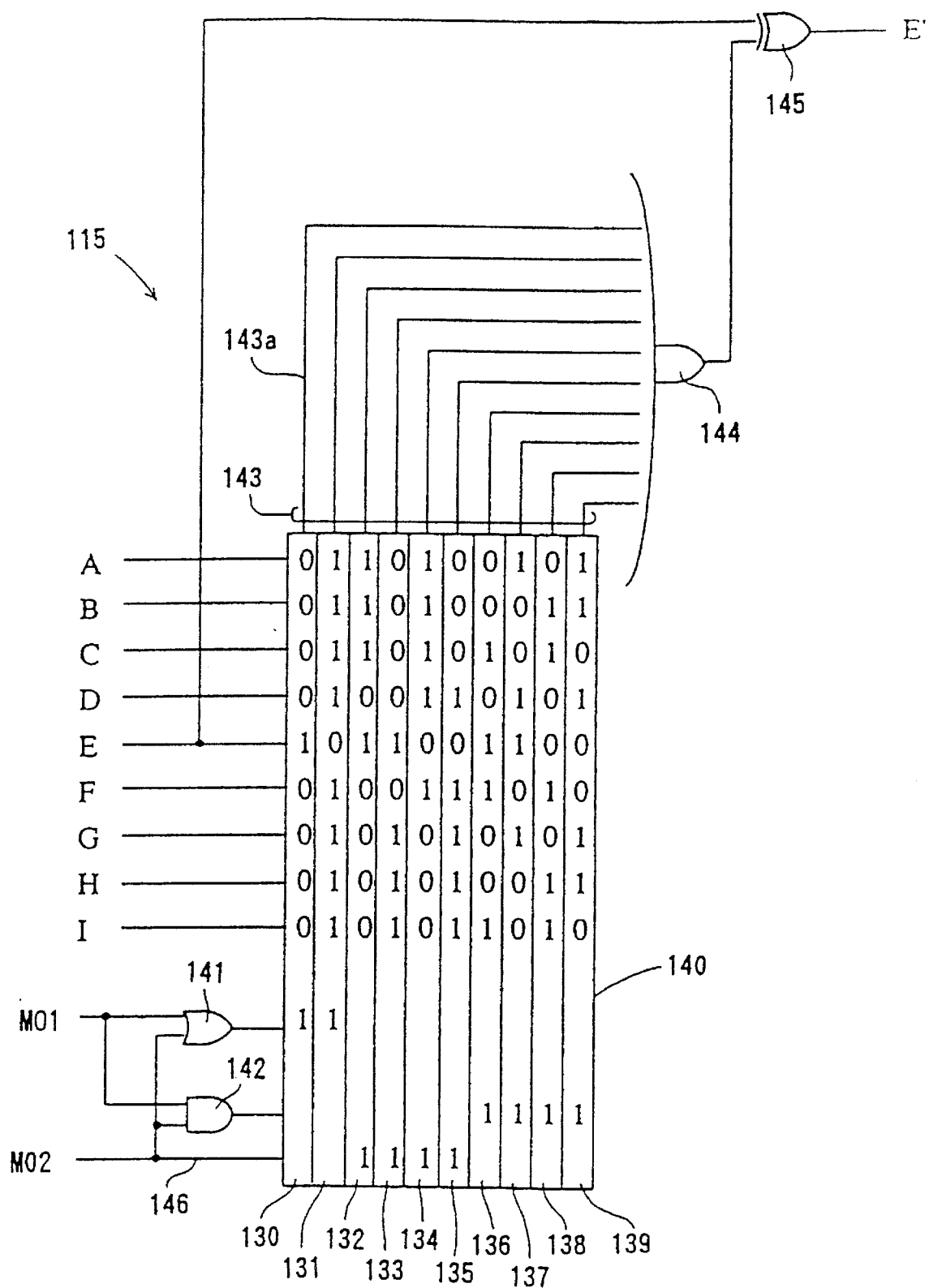
FIG. 36 is a block diagram showing the construction of a binary-coding rejudging circuit.

FIG. 36 is a diagram showing the internal construction of the binary-coding rejudging circuit 115. The binary-coding rejudging circuit 115 comprises a logical operating section 14 constituted by a logic circuit mainly composed of AND gates. Binary data corresponding to pixels arranged in a matrix with 3×3 pixels are inputted to the logical operating section 140 from the input terminals A, B, C, ..., I thereof. In addition, 2-bit mode selection data M01 and M02 from the mode register 116 are inputted to the logical operating section 140 through an OR gate 141, an AND gate 142 and a line 146.

The logical operating section 140 are functionally divided into ten logic circuit sections 130, 132, ..., 139. Each of the logic circuit sections 130 to 139 outputs a signal having a logic "1" to a line 143 when output signals of the input terminals A to I, the OR gate 141 and the AND gate 142 enter a state shown in FIG. 36. For example, the logic circuit section 130 outputs a signal having a logic "1" to a line 143a when input signals from the input terminal E and the OR gate 141 have a logic "1" and the remaining input signals have a logic "0".

The signal outputted to the line 143 is applied to one input terminal of an exclusive-OR gate 145 through an OR gate 144. The signal from the input terminal E is applied to the other input terminal of the exclusive-OR gate 145. An output of the exclusive OR gate 145 is outputted to an output terminal E' as data corresponding to a target pixel after binary-coding rejudgment processing. Specifically, input data from the input terminal E which is binary data corresponding to the target pixel is inverted if the output of the OR gate 144 has a logic "1", while being data after binary-coding rejudgment processing without any change if the output of the OR gate 144 has a logic "0".

It is assumed that a white pixel has a logic "1" and a black pixel has a logic "0". In this case, as apparent from the comparison between FIGS. 27, 28 and 29 and FIG. 31, there is the following correspondence between the logic circuit sections 130 to 139 and FIGS. 27, 28 and 29:

logic circuit section 130 . . . FIG. 27(a)
logic circuit section 131 . . . FIG. 27(b)
logic circuit section 132 . . . FIG. 28(a)
logic circuit section 133 . . . FIG. 28(b)
logic circuit section 134 . . . FIG. 28(c)
logic circuit section 135 . . . FIG. 28(d)
logic circuit section 136 . . . FIG. 29(a)
logic circuit section 137 . . . FIG. 29(b)
logic circuit section 138 . . . FIG. 29(c)
logic circuit section 139 . . . FIG. 29(d)

On the other hand, the correspondence between the above described first, second and third modes and the mode selection data M01 and M02 is as follows:

first mode . . . M01=1, M02=0
second mode . . . M01=0, M02=1
second mode . . . M01=1, M02=1

Consequently, in the first mode, only the output signal of the OR Gate 141 has a logic "1", so that only the logic circuit sections 130 and 131 are effective. With respect to the images shown in FIG. 27(a) and 27(b), therefore, the binary data applied to the input terminal E is inverted.

Furthermore, in the second mode, the output signal of the OR Gate 141 and the signal from the line 146 have a logic "1", so that the logic circuit sections 130 to 135 are effective. Therefore, with respect to the images shown in FIG. 27(a) and 27(b) and FIGS. 28(a), 28(b), 28(c) and (d), the binary data applied to the input terminal E is inverted.

Additionally, in the third mode, all the output signal of the OR gate 141, the output signal of the AND gate 142 and the signal from the line 146 have a logic "1", so that all the logic circuit sections 130 to 139 are effective. Therefore, with respect to all the images shown in FIGS. 27, 28 and 29, the data from the input terminal E is inverted.

In the above described manner, the binary-coding rejudgment processing in each mode is achieved. The patterns shown in FIGS. 27, 28 and 29 cover all patterns in which an isolated pixel occurs. Accordingly, an isolated pixel existing in a binary image is reliably removed even if it occurs due to any cause. Consequently, compression efficiency in compression coding of the binary image is increased, thereby making it possible to decrease the amounts of transmission codes. Consequently, it is possible to increase the speed of communication and shorten a time period during which a communication line is occupied.

It may be determined in consideration of a balance between the image quality and the transmission speed which mode of the first, second and third modes is to be selected.

On the other hand, storage areas in a part of the memory 18 are used as the line memory 110 for isolated point removal processing, as described above. Therefore, processing can be performed without preparing high-cost and complicated structures capable of storing binary data corresponding to one line such as a shift register and a FIFO (first-in first-out) memory, thereby making it possible to contribute to the reduction in cost.

Furthermore, access to the line memory 110 is made in units of a plurality of pixels using a n-bit shift register. Therefore, the number of times of access to the line memory 110 may be small, thereby making it possible to perform high-speed processing. Moreover, binary data is read/written in units of a plurality of pixels, thereby making it possible to share common storage areas with filtering processing and error diffusion processing for processing multivalued density data constituted by a plurality of bits (see FIG. 6).

Figure 37:
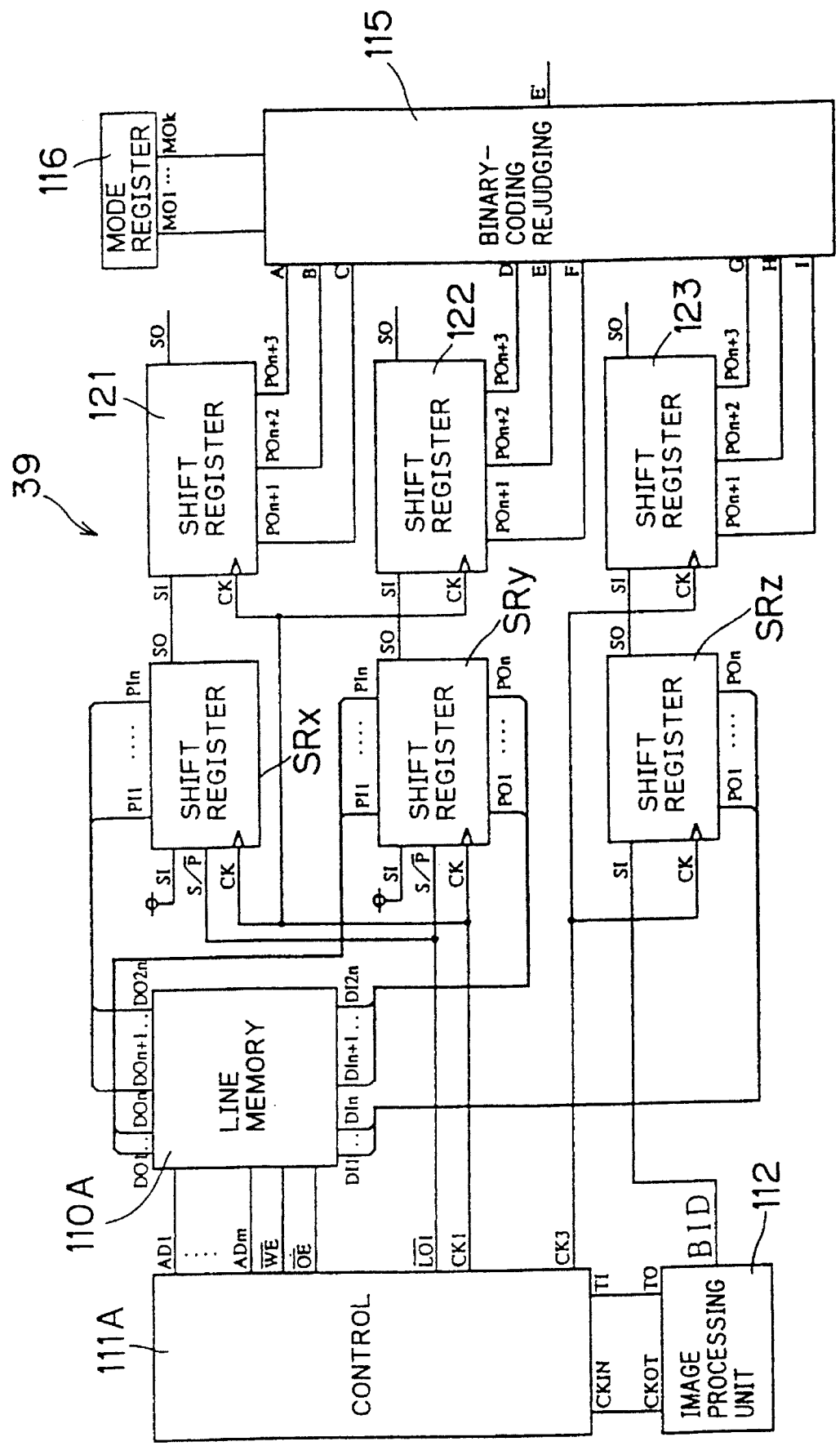
FIG. 37 is a block diagram showing another example of the construction of an isolated point removal processing section.

FIG. 37 is a block diagram showing another example of the construction of an isolated point removal processing section 39. In FIG. 37, portions corresponding to the respective portions shown in FIG. 30 are assigned the same reference numerals. In the example of the construction, a line memory 110A capable of storing as one word 2 n-bit data which is two times the capacity of shift registers SRx, SRy and SRz and capable of storing binary data corresponding to two lines as a whole is formed in storage areas in a part of the memory 18 (see FIG. 1).

n-bit data corresponding to the present line which are held in the shift register SRz are applied to terminals DI1 to DIn corresponding to the lower n bits out of 2 n-bit input terminals DI1 to DI2n of the line memory 110A. In addition, n-bit data corresponding to a line one line ahead of the preset line which are held in the shift register SRy are applied to terminals DIn+1 to DI2n corresponding to higher n bits.

On the other hand, data outputted to terminals DO1 to DOn corresponding to lower n bit out of 2 n-bit output terminals DO1 to DO2n of the line memory 110A are applied to the shift register SRy corresponding to a line two lines ahead of the present line. In addition, data outputted to terminals DOn+1 to DO2n corresponding to higher n bits are applied to the shift register SRx corresponding to a line one line ahead of the present line.

A control signal LO1 and a clock signal CK1 from a control circuit 111A are applied to both the shift registers SRx and SRy.

By this construction, the n-bit data corresponding to the present line are written to the lower n bits of each of the words in the line memory 110A. In a time period during which data corresponding to a line succeeding the present line are applied from an image processing unit 112, the n-bit data corresponding to the present line are applied to the shift register SRy as data corresponding to a line one line ahead of the succeeding line.

The data corresponding to a line one line ahead of the present line which are written in the shift register SRy are written as data corresponding to the upper n bits of each of the words in the line memory 110A. When processing with respect to the succeeding line is performed, the data corresponding to the line one line ahead of the present line are applied to the shift register SRx as data corresponding to a line two lines ahead of the succeeding line.

FIG. 38 is a timing chart for explaining the operation. The image processing unit 112 so sequentially outputs data corresponding to the present line in a time period from the second cycle that the order is first the data corresponding to the first pixel. At this time, the control circuit 111A sets addresses AD1 to ADm to a value "0" corresponding to the first pixel in a time period elapsed until data ID(n−1)z corresponding to the (n−1)-th pixel is outputted and data IDnz corresponding to the n-th pixel is further outputted.

At the time t11 when data corresponding to n pixels are accumulated in the shift register SRz, an output enable signal OE falls, so that n-bit data are outputted to the output terminals DO1 to DOn of the line memory 110A and are applied to the shift register SRy. The n-bit data correspond to data ID1y to IDny corresponding to the first pixel to the n-th pixel belonging to a line one line ahead of the present line. In addition, n-bit data are also outputted to the output terminals DOn+1 to DO2n of the line memory 110A and are applied to the shift register SRx. The n-bit data correspond to data ID1x to IDnx corresponding to the first pixel to the n-th pixel belonging to a line two lines ahead of the present line.

When the output enable signal OE rises at the time t12, a write enable signal WE alternately falls at the time t13, so that data ID1z to IDnz corresponding to n pixels belonging to the present line which are held in the shift register SRz are written to the line memory 110A from the input terminals DI1 to DIn thereof. At the same time, data ID1y to IDny corresponding to n pixels belonging to the line one line ahead of the present line which are held in the shift register SRy are written to the line memory 110A from the input terminals DIn+1 to DI2n thereof. Addresses at which data are written at this time are addresses to which the data ID1y to IDny and ID1x to IDnx corresponding to the lines one line and two lines ahead of the present line have been written. Specifically, new data are written to addresses from which data have been read out.

After the writing is terminated, the control circuit 111A switches addresses AD1 to ADm to the subsequent value "1" in a time period from the (n+1) cycle.

When a clock signal CK1 is applied at the time t14, a shifting operation is performed in the shift registers SRx and SRy. As a result, the data ID1x and ID1y corresponding to the respective first pixels belonging to the lines one line and two lines ahead of the present line are respectively inputted to input terminals C and F of the binary-coding rejudging circuit 115 which correspond to the respective first stages of shift registers 121 and 122.

Furthermore, when a clock signal CK3 is applied to the shift register SRz at the time t15, the data ID1z corresponding to the first pixel belonging to the present line is held in the first stage of the shift register 123, and is applied to the input terminal I of the binary-coding rejudging circuit 115 as a shifting operation is performed in the shift register SRz.

Thereafter, a shifting operation is performed in the shift registers SRx, SRy and SRz and the shift registers 121, 122 and 123 as the clock signals CK1 and CK3 are inputted. At the time t16, data corresponding to nine pixels for performing binary-coding rejudgment processing of the data ID2y are inputted in parallel to the binary-coding rejudging circuit 115. Consequently, data ID'2y after rejudgment is outputted to the output terminal E'.

In the above described manner, in the example of the construction, data corresponding to adjacent two lines are stored by bit division of each word in the line memory 110A in performing isolated point removal processing using a line memory corresponding to two lines. The shift registers SRx, SRy and SRz and the line memory 110A are connected to each other so that data corresponding to a line ahead of a line corresponding to lower bits of each word are stored in the upper bits of the word.

By this construction, if continuous addresses are generated for processing with respect to any line, data corresponding to lines one line and two lines ahead of the present data can be applied to the shift registers SRx and SRy. Accordingly, the necessity of devising addresses applied to the line memory 110A as in the example of the above described first construction shown in FIG. 30 is eliminated. Consequently, the necessity of applying a signal ROW which is toggled for each processing with respect to one line to the control circuit 111A from the image processing unit 112 is also eliminated.

Although description was made in the foregoing, the present invention is not limited to the above described embodiments. For example, although in the above described embodiments, a facsimile is taken as an example, the present invention is widely applicable to a structure for processing image data obtained by optically reading an image, for example, an image scanner and a copying machine.

Although the present invention has been described and illustrated in detail, it is clearly understood that the same is by way of illustration and example only and is not to be taken by way of limitation, and that the spirit and scope of the present invention is limited only by the terms of the appended claims.

What is claimed is:

1. An image density reproducing method in which density data for each pixel obtained by reading a document in a unit of a predetermined pixel using optical image reading means is processed to reproduce the density of the document, comprising the steps of:

detecting, when an image of the read document is divided into image portions each including a predetermined number of pixels constituting a predetermined matrix, a position of a target pixel which is to be processed in said predetermined matrix; and subjecting, in accordance with gamma correction characteristics predetermined to correspond to each pixel position in said predetermined matrix, the density data corresponding to the target pixel to gamma correction on the basis of the position in said predetermined matrix of said target pixel.

2. An image density reproducing apparatus for processing density data for each pixel obtained by reading a document in a unit of a predetermined pixel using optical image reading means to reproduce the density of the document, comprising:

means for detecting, when an image of the read document is divided into image portions each including a predetermined number of pixels constituting a predetermined matrix, a position of a target pixel which is to be processed in said predetermined matrix;

density correcting means for adding a density correcting value predetermined to correspond to each pixel position in said predetermined matrix to the density data corresponding to the target pixel on the basis of the position of said target pixel in said predetermined matrix; and means for judging whether or not the density data of the target pixel satisfies a predetermined condition predetermined for each pixel position in said matrix, said density correcting means adding the density correcting value to the density data corresponding to the target pixel only when said density data of the target pixel satisfies said predetermined condition.

3. An image density reproducing apparatus for processing density data for each pixel obtained by reading a document in a unit of a predetermined pixel using optical image reading means to reproduce the density of the document, comprising:

means for detecting, when an image of the read document is divided into image portions each including a predetermined number of pixels constituting a predetermined matrix, a position of a target pixel which is to be processed in said predetermined matrix; and means for subjecting, in accordance with gamma correction characteristics predetermined to correspond to each pixel position in said predetermined matrix, the density data corresponding to the target pixel to gamma correction on the basis of the position of said target pixel in said predetermined matrix.

* * * * *